US012718344B2

(12) United States Patent
Okuyama et al.

(10) Patent No.: US 12,718,344 B2
(45) Date of Patent: Aug. 25, 2026

(54) COMPUTER SYSTEM, DIMENSION MEASURING METHOD, AND SEMICONDUCTOR DEVICE MANUFACTURING SYSTEM

(71) Applicant: Hitachi High-Tech Corporation, Tokyo (JP)

(72) Inventors: Yutaka Okuyama, Tokyo (JP); Takeshi Ohmori, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 18/279,496

(22) PCT Filed: Aug. 26, 2022

(86) PCT No.: PCT/JP2022/032199
§ 371 (c)(1),
(2) Date: Aug. 30, 2023

(87) PCT Pub. No.: WO2024/042702
PCT Pub. Date: Feb. 29, 2024

(65) Prior Publication Data

US 2025/0182261 A1 Jun. 5, 2025

(51) Int. Cl.
*G06T 7/00* (2017.01)
*G06T 7/60* (2017.01)
*G06T 7/73* (2017.01)

(52) U.S. Cl.
CPC .............. *G06T 7/0004* (2013.01); *G06T 7/60* (2013.01); *G06T 7/73* (2017.01); *G06T 2200/24* (2013.01);
(Continued)

(58) Field of Classification Search
None
See application file for complete search history.

(56) References Cited

U.S. PATENT DOCUMENTS 7,910,885 B2 3/2011 Rosenberg et al.
2002/0181776 A1 12/2002 Yutaka
(Continued)

FOREIGN PATENT DOCUMENTS

CN 106886998 A 6/2017
CN 109765254 A 5/2019
(Continued)

OTHER PUBLICATIONS

Search Report mailed Nov. 15, 2022 in International Application No. PCT/JP2022/032199.
(Continued)

*Primary Examiner* — Wassim Mahrouka
(74) *Attorney, Agent, or Firm* — Miles & Stockbridge, P.C.

(57) ABSTRACT

A computer system for extracting, from image data, coordinate information on base points for measuring a dimension of a desired portion of a pattern, and measuring the dimension by using the coordinate information, the computer system including a preprocessing unit configured to allow training by matching all of the samples by setting a base point insufficient in annotation data as an insufficient measurement portion and shielding the insufficient measurement portion on the image data for the sample in which coordinate values of only a part of the base points are described, the preprocessing unit is also configured to allow learning and is trained in advance by using training data in which the image data is set as an input and the coordinate information is set as an output, and the preprocessing unit extracts the coordinate information and the dimension for new image data input for learning.

15 Claims, 25 Drawing Sheets

(52) U.S. Cl.
CPC ............... *G06T 2207/20081* (2013.01); *G06T 2207/30148* (2013.01)

(56) References Cited

U.S. PATENT DOCUMENTS

| | | | |
|---|---|---|---|
| 2005/0116182 | A1 | 6/2005 | Tanaka et al. |
| 2006/0060774 | A1 | 3/2006 | Mayuka et al. |
| 2009/0212212 | A1 | 8/2009 | Shishido et al. |
| 2009/0231424 | A1 | 9/2009 | Honda et al. |
| 2015/0228063 | A1 | 8/2015 | Minakawa et al. |
| 2016/0163035 | A1 | 6/2016 | Chang et al. |
| 2017/0177997 | A1 | 6/2017 | Karlinsky et al. |
| 2018/0082873 | A1 | 3/2018 | Ohmori et al. |
| 2018/0342078 | A1 | 11/2018 | Watanabe |
| 2019/0148108 | A1 | 5/2019 | Sun et al. |
| 2020/0056141 | A1 | 2/2020 | Akira et al. |
| 2021/0035833 | A1 | 2/2021 | Feng et al. |
| 2021/0048794 | A1 | 2/2021 | Moki et al. |
| 2021/0049356 | A1* | 2/2021 | Gu ........................ G06F 18/217 |
| 2021/0089836 | A1* | 3/2021 | Tang ..................... G06F 18/214 |
| 2021/0241436 | A1 | 8/2021 | Ohmori et al. |
| 2021/0287354 | A1* | 9/2021 | Kumar .................. G06T 7/0004 |
| 2021/0302155 | A1 | 9/2021 | Matsuda |
| 2021/0374936 | A1 | 12/2021 | Koopman et al. |
| 2022/0139788 | A1 | 5/2022 | Okuyama et al. |

FOREIGN PATENT DOCUMENTS

| | | | |
|---|---|---|---|
| JP | 2002-350127 | A | 12/2002 |
| JP | 2009-206453 | A | 9/2009 |
| JP | 2012-068138 | A | 4/2012 |
| JP | 2014-081220 | A | 5/2014 |
| JP | 2017-011816 | A | 1/2017 |
| JP | 2018-049936 | A | 3/2018 |
| JP | 2018-506168 | A | 3/2018 |
| JP | 2019-087518 | A | 6/2019 |
| JP | 2019-119545 | A | 7/2019 |
| JP | 6872670 | B2 | 5/2021 |
| JP | 2021-124933 | A | 8/2021 |
| WO | 2018189877 | A1 | 10/2018 |
| WO | 2021024402 | A1 | 2/2021 |

OTHER PUBLICATIONS

Search Report mailed Oct. 8, 2019 in International Application No. PCT/JP2019/031076.

Written Opinion mailed Oct. 8, 2019 in International Application No. PCT/JP2019/031076.

Search Report mailed Oct. 1, 2019 in International Application No. PCT/JP2019/026595.

Written Opinion mailed Oct. 1, 2019 in International Application No. PCT/JP2019/026595.

Office Action mailed Jan. 29, 2022 in Chinese Application No. 201980007814.9.

Notice of Allowance mailed Nov. 2, 2022 in U.S. Appl. No. 16/957,480.

Office Action mailed Mar. 21, 2022 in U.S. Appl. No. 16/957,480.

Notice of Allowance mailed Aug. 15, 2022 in U.S. Appl. No. 16/981,973.

Office Action mailed Jan. 25, 2022 in U.S. Appl. No. 16/981,973.

* cited by examiner

[FIG. 1]
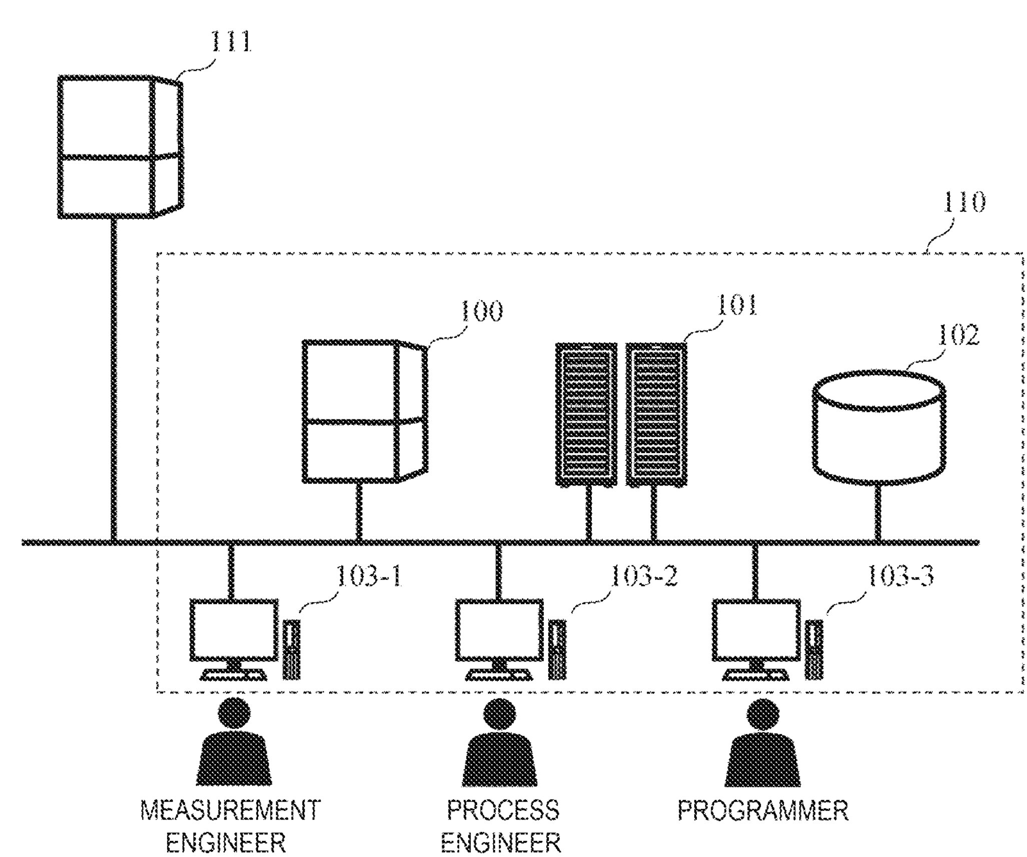

[FIG. 2]
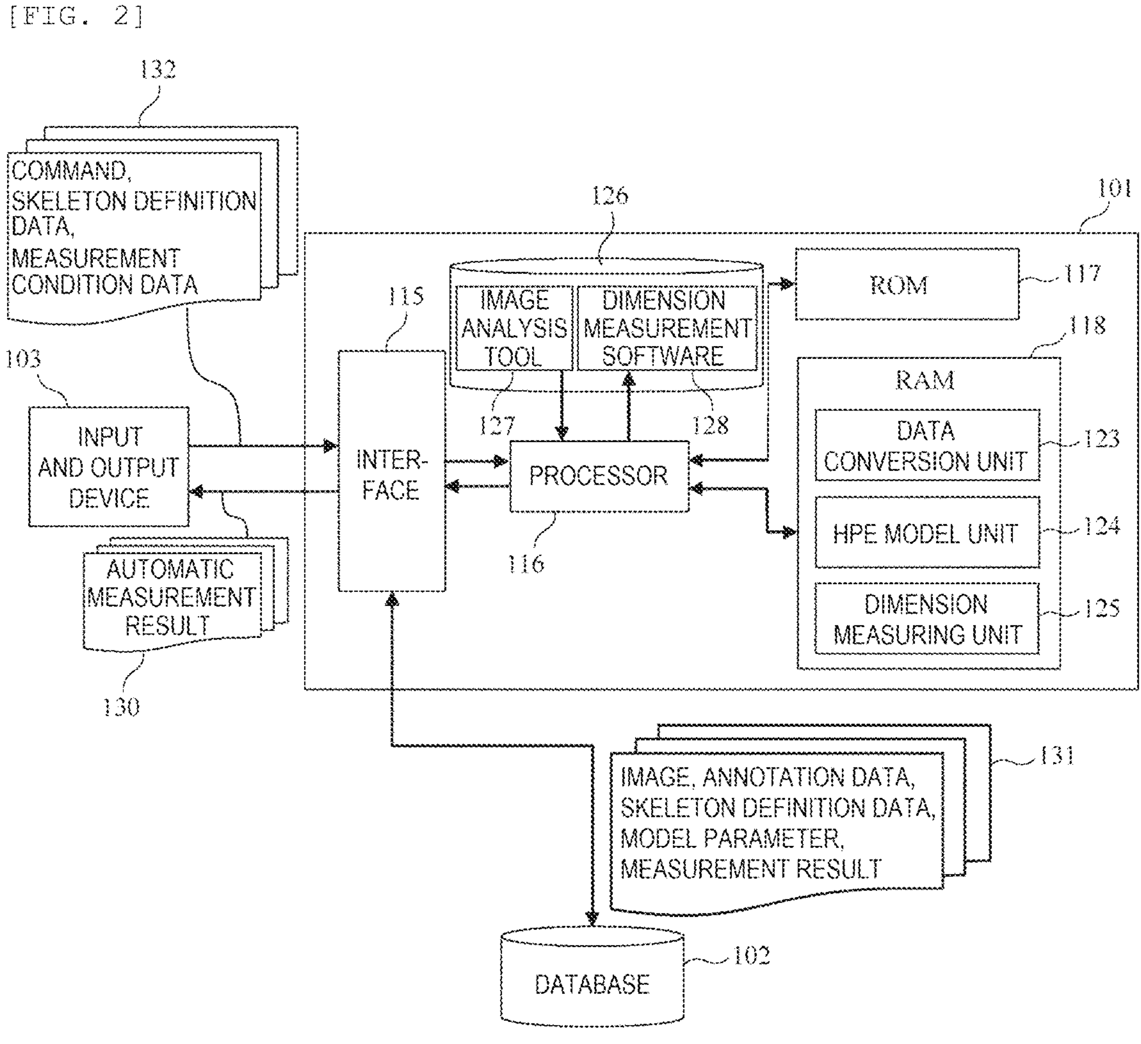

[FIG. 3]
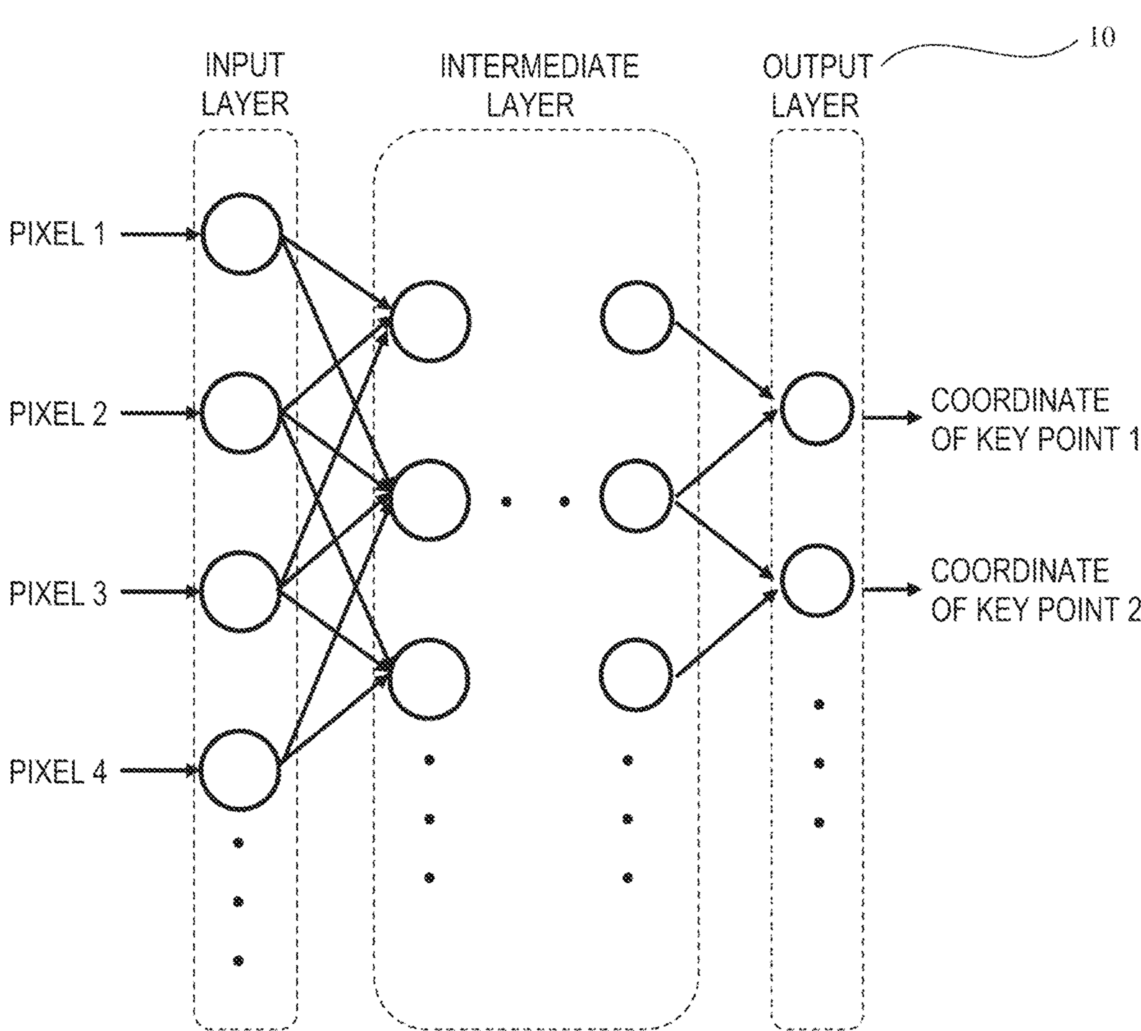

[FIG. 4]
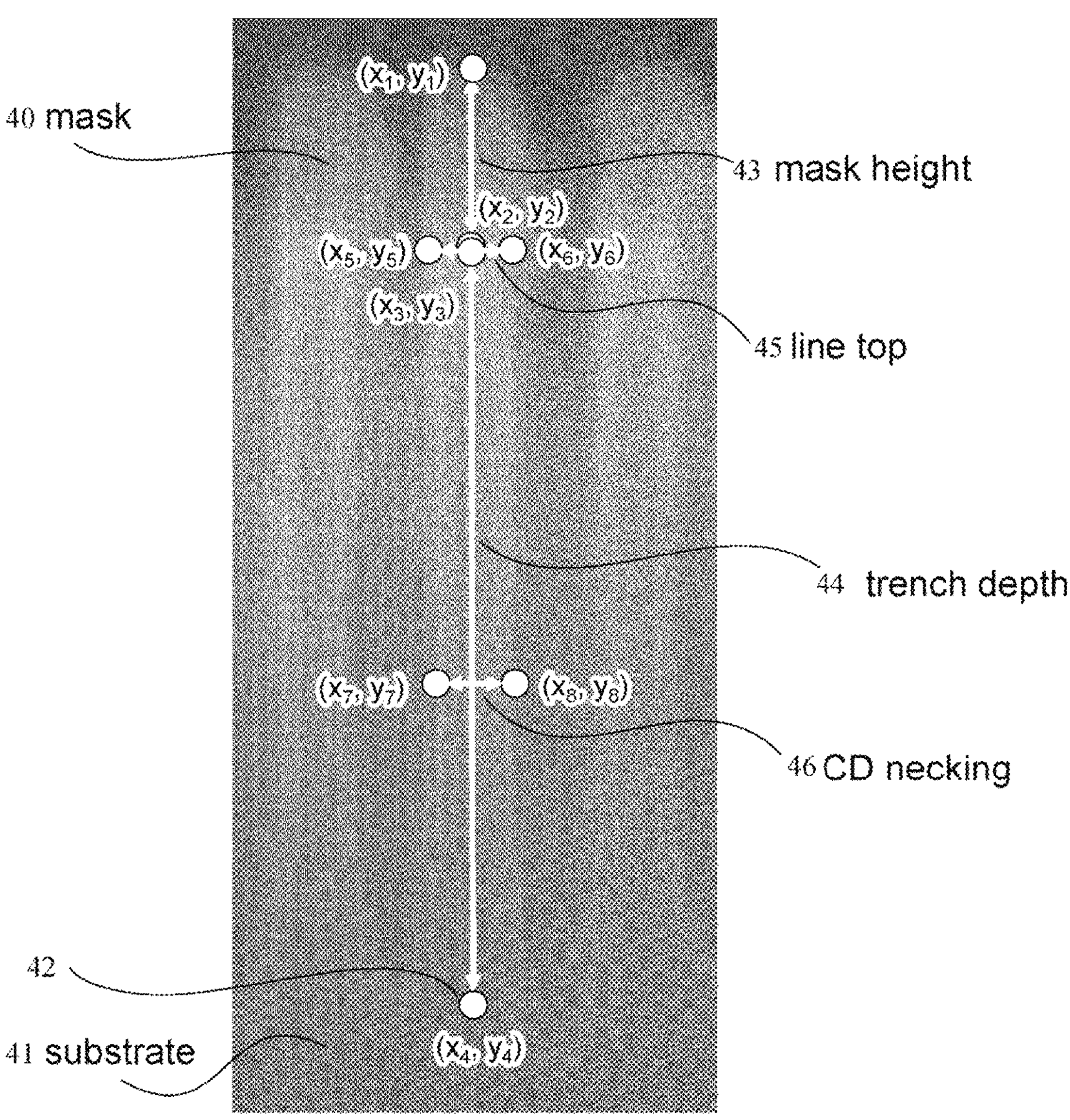

[FIG. 5]
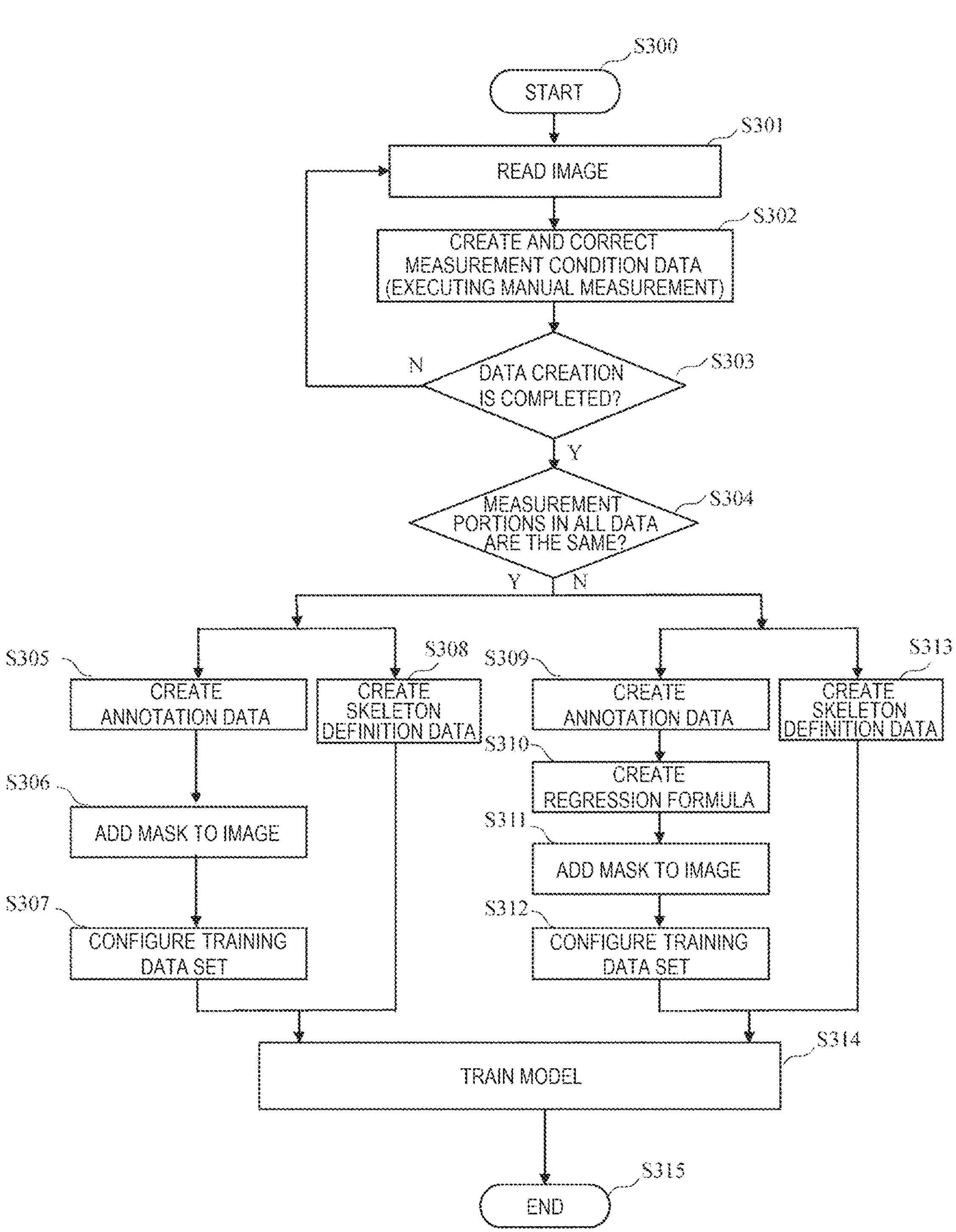

[FIG. 6]
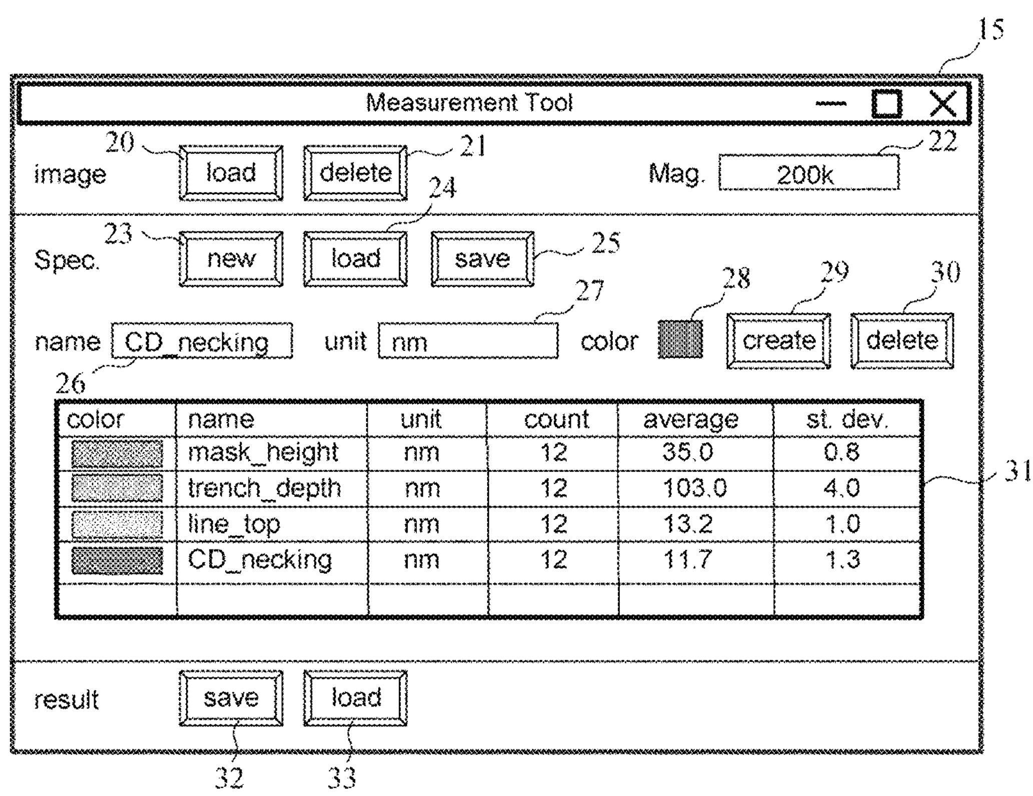

[FIG. 7]

```
.....
{"name" : "mask_height",
            "measurementList" : [
            {"measumentName" : "L1", "positionList" :[{x1, y1}, {x2, y2}]}
            ]
},
{"name" : "trench_depth",
            "measurementList" : [
            {"measumentName" : "L2", "positionList" :[{x3, y3}, {x4, y4}]}
            ]
},
{"name" : "line_top",
            "measurementList" : [
            {"measumentName" : "L3", "positionList" :[{x5, y5}, {x6, y6}]}
            ]
},
{"name" : "CD_necking",
            "measurementList" : [
            {"measumentName" : "L4", "positionList" :[{x7, y7}, {x8, y8}]}
            ]
},
.....
```

[FIG. 8]

```
.....
"annotations": [
        { "keypoints" : [x1, y1, 2, x2, y2, 2, 0, 0, 0, 0, 0, 0, 0, 0, 0, 0, 0, 0, 0, 0, 0, 0, 0, 0], "id" : 1000},
        { "keypoints" : [0, 0, 0, 0, 0, 0, x3, y3, 2, x4, y4, 2, x5, y5, 2, x6, y6, 2, x7, y7, 2, x8, y8, 2], "id" : 1001}
        ]
.....
```

[FIG. 9]
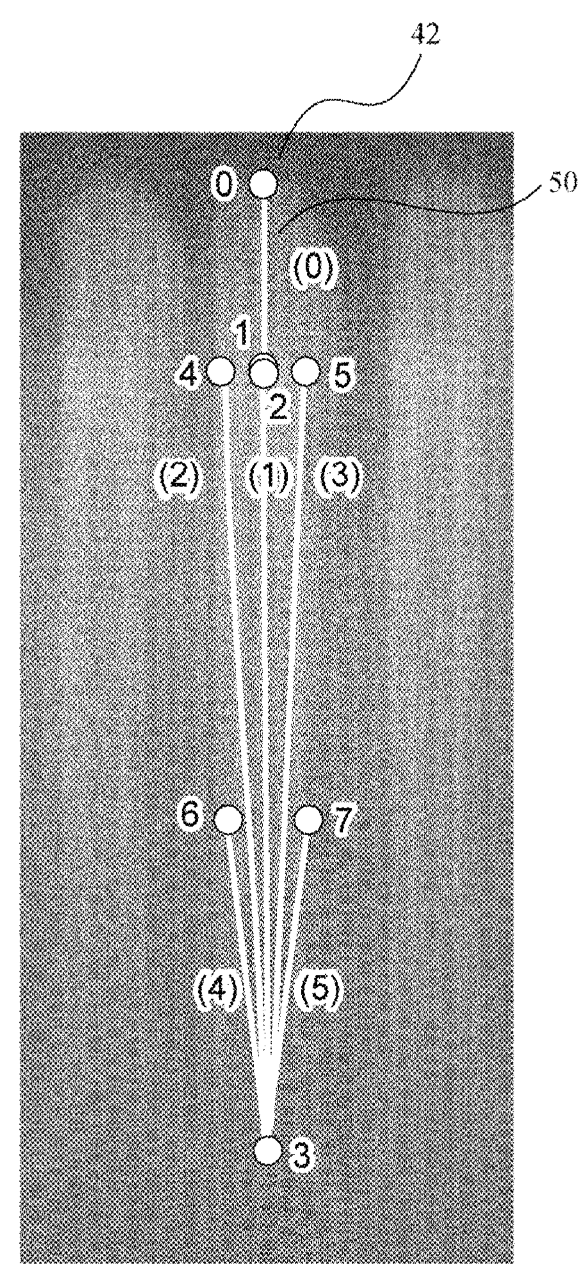

[FIG. 10]

```
params_kp_limb = {
    'limbs_point': [
        [0, 1],
        [2, 3],
        [4, 3],
        [5, 3],
        [6, 3],
        [7, 3],
    ],

    'joint_indices': [
         0 ,
         1 ,
         2 ,
         3 ,
         4 ,
         5 ,
         6 ,
         7 ,
],

}
```

[FIG. 11]
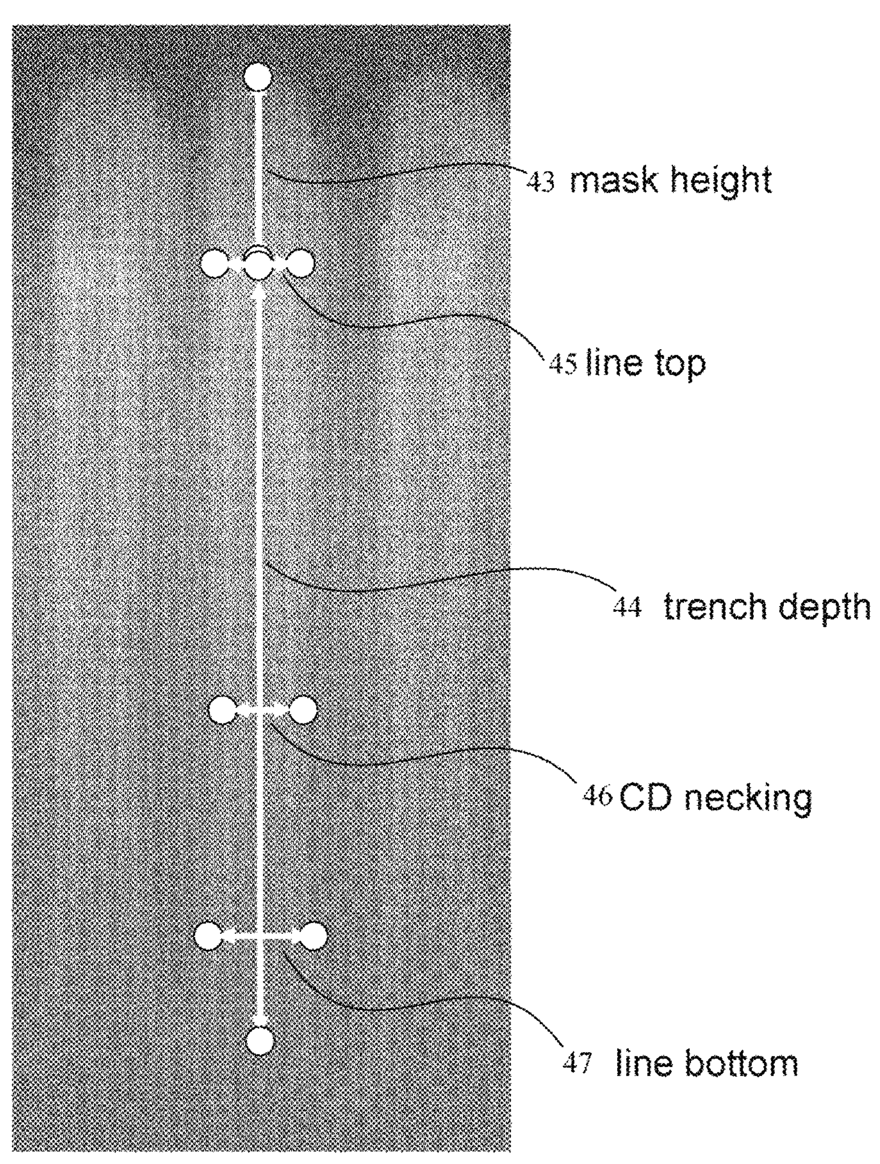

[FIG. 12]

```
.....
{"name" : "mask_height",
        "measurementList" : [
        {"measumentName" : "L1", "positionList" :[{x1, y1}, {x2, y2}]},
        {"measumentName" : "L2", "positionList" :[{x9, y9}, {x10, y10}]}
        ]
},
{"name" : "trench_depth",
        "measurementList" : [
        {"measumentName" : "L3", "positionList" :[{x3, y3}, {x4, y4}]}
        ]
},
{"name" : "line_top",
        "measurementList" : [
        {"measumentName" : "L4", "positionList" :[{x5, y5}, {x6, y6}]}
        ]
},
{"name" : "CD_necking",
        "measurementList" : [
        {"measumentName" : "L5", "positionList" :[{x7, y7}, {x8, y8}]}
        ]
},
{"name" : "line_bottom",
        "measurementList" : [
        {"measumentName" : "L6", "positionList" :[{x9, y9}, {x10, y10}]}
        ]
}

.....
```

```
.....
"annotations": [
        { "keypoints" : [x1, y1, 2, x2, y2, 2, 0, 0, 0, 0, 0, 0, 0, 0, 0, 0, 0, 0, 0, 0, 0, 0, 0, 0, 0], "id" : 1000},
        { "keypoints" : [0, 0, 0, 0, 0, 0, x3, y3, 2, x4, y4, 2, x5, y5, 2, x6, y6, 2, x7, y7, 2, x8, y8, 2,
          x9, y9, 2, x10, y10, 2], "id" : 1001},
        .....
```

[FIG. 13B]

```
.....
"annotations": [
        { "keypoints" : [x1, y1, 2, x2, y2, 2, 0, 0, 0, 0, 0, 0, 0, 0, 0, 0, 0, 0, 0, 0, 0, 0, 0, 0, 0], "id" : 1002},
        { "keypoints" : [0, 0, 0, 0, 0, 0, x3, y3, 2, x4, y4, 2, x5, y5, 2, x6, y6, 2, x7, y7, 2, x8, y8, 2,
          0, 0, 0, 0, 0, 0], "id" : 1003},
```

[FIG. 14A]
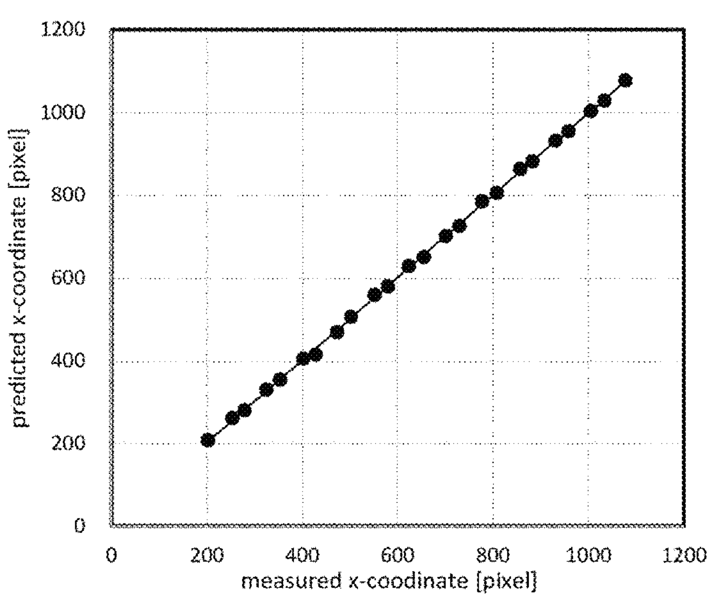
[FIG. 14B]
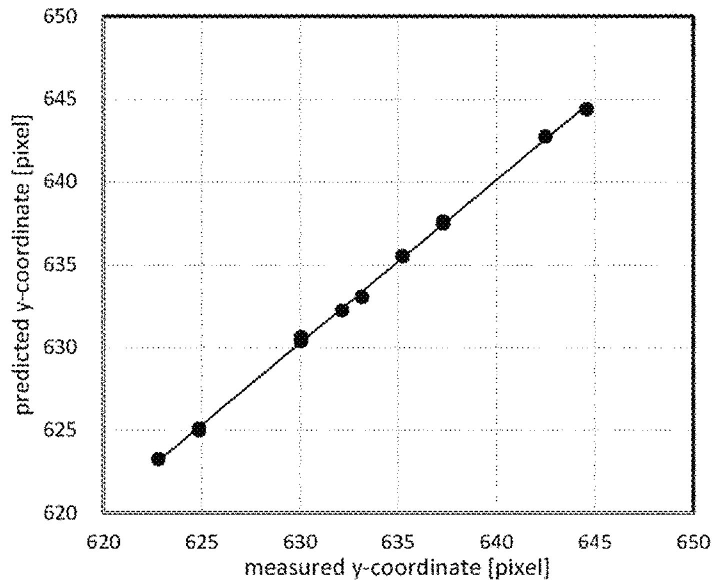

[FIG. 15]
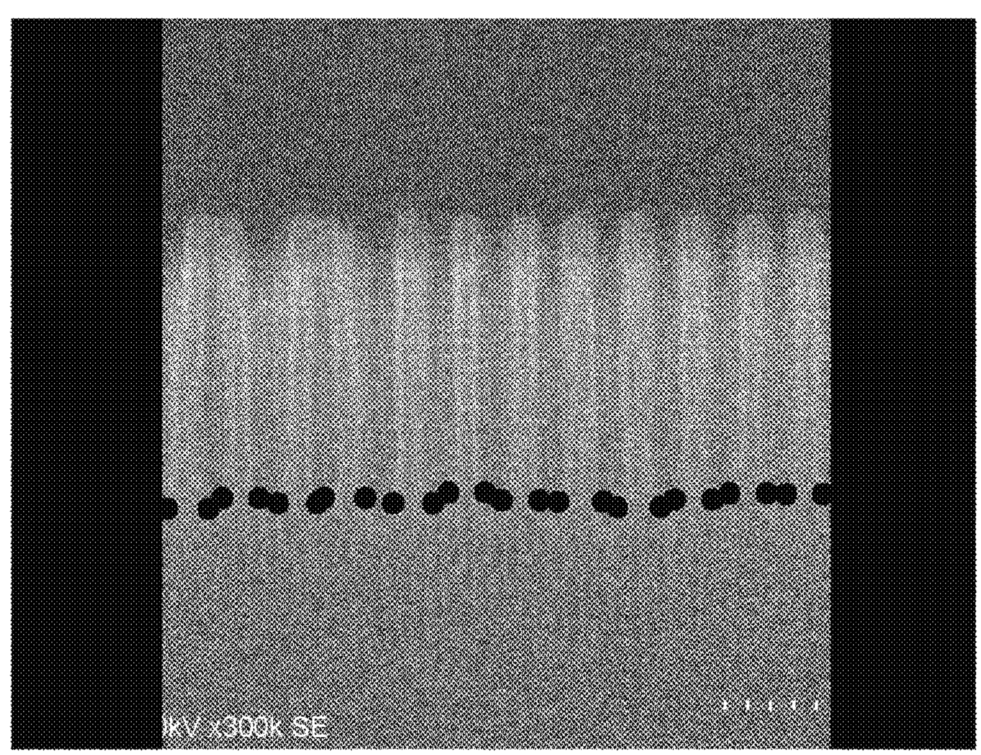

[FIG. 16]
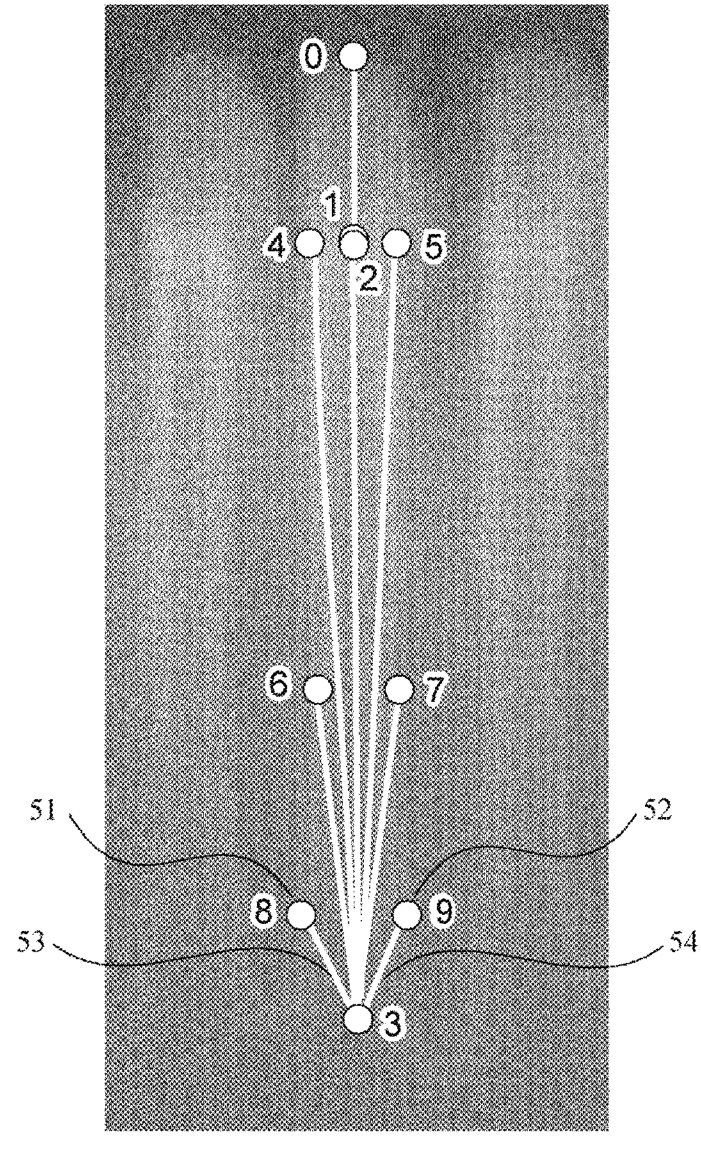

[FIG. 17]

```
params_kp_limb = {
    'limbs_point': [
        [0, 1],
        [2, 3],
        [4, 3],
        [5, 3],
        [6, 3],
        [7, 3],
        [8, 3],
        [9, 3],
    ],

    'joint_indices': [
        0 ,
        1 ,
        2 ,
        3 ,
        4 ,
        5 ,
        6 ,
        7 ,
        8 ,
        9 ,
    ],

}
```

[FIG. 18]
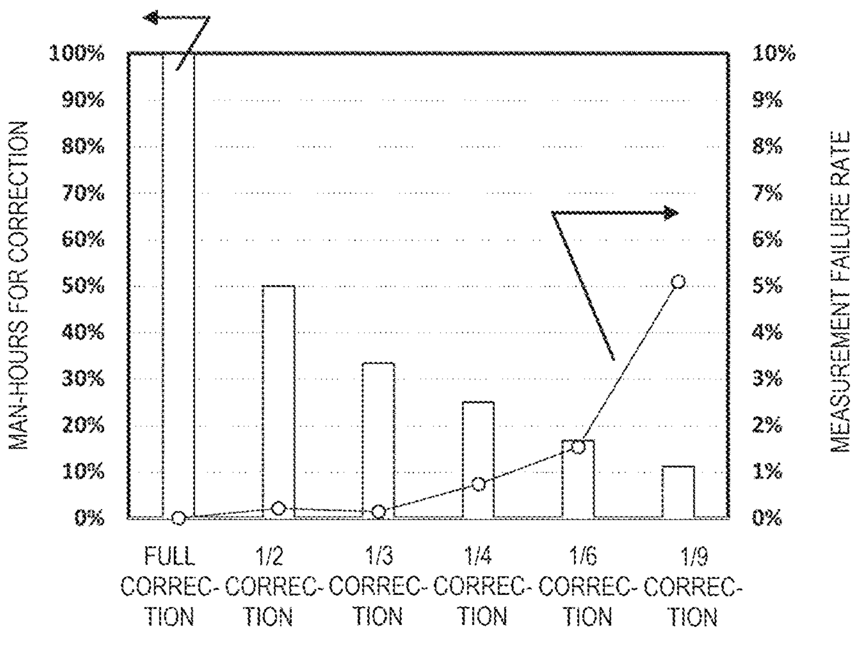

[FIG. 19]
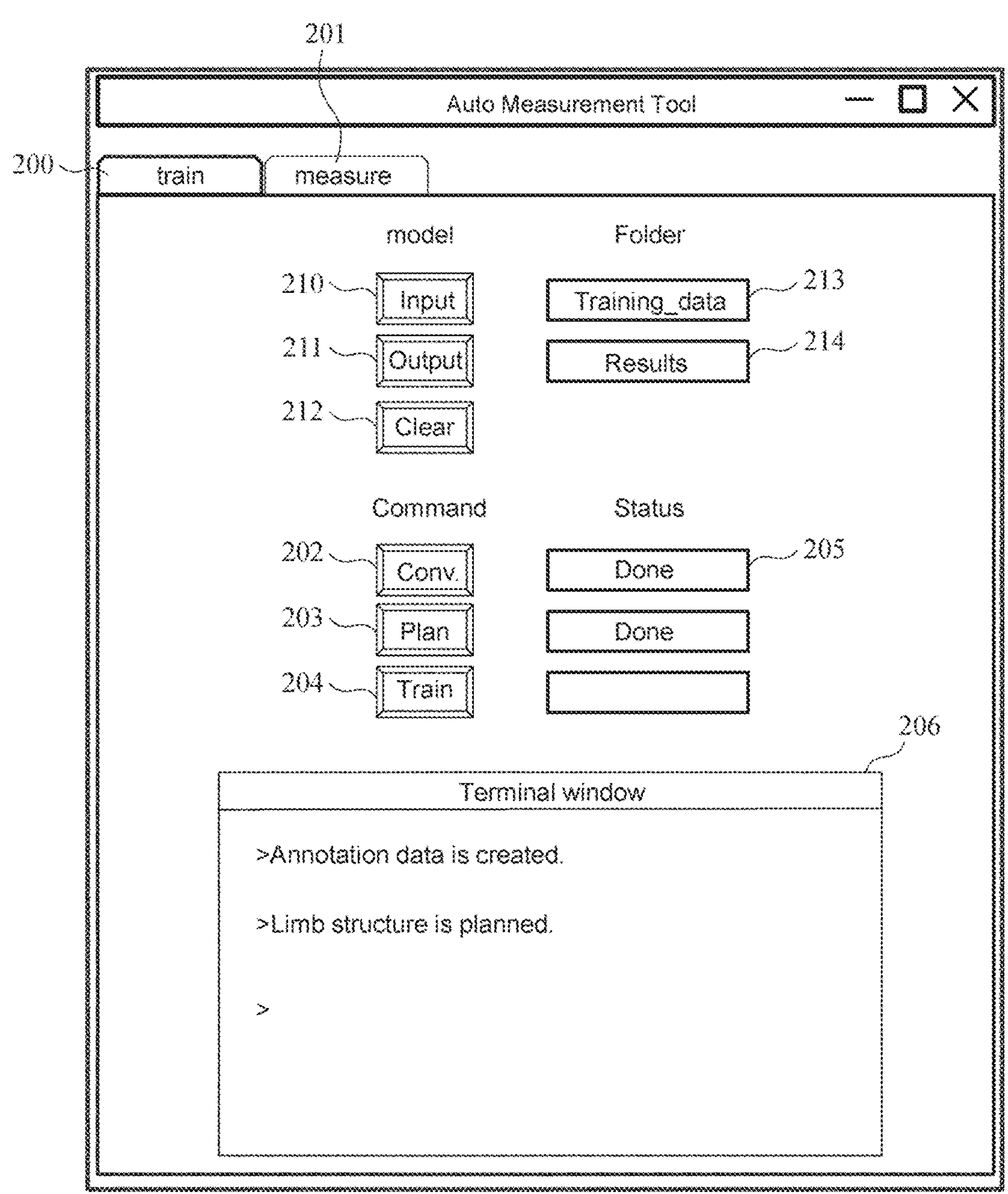

[FIG. 20]
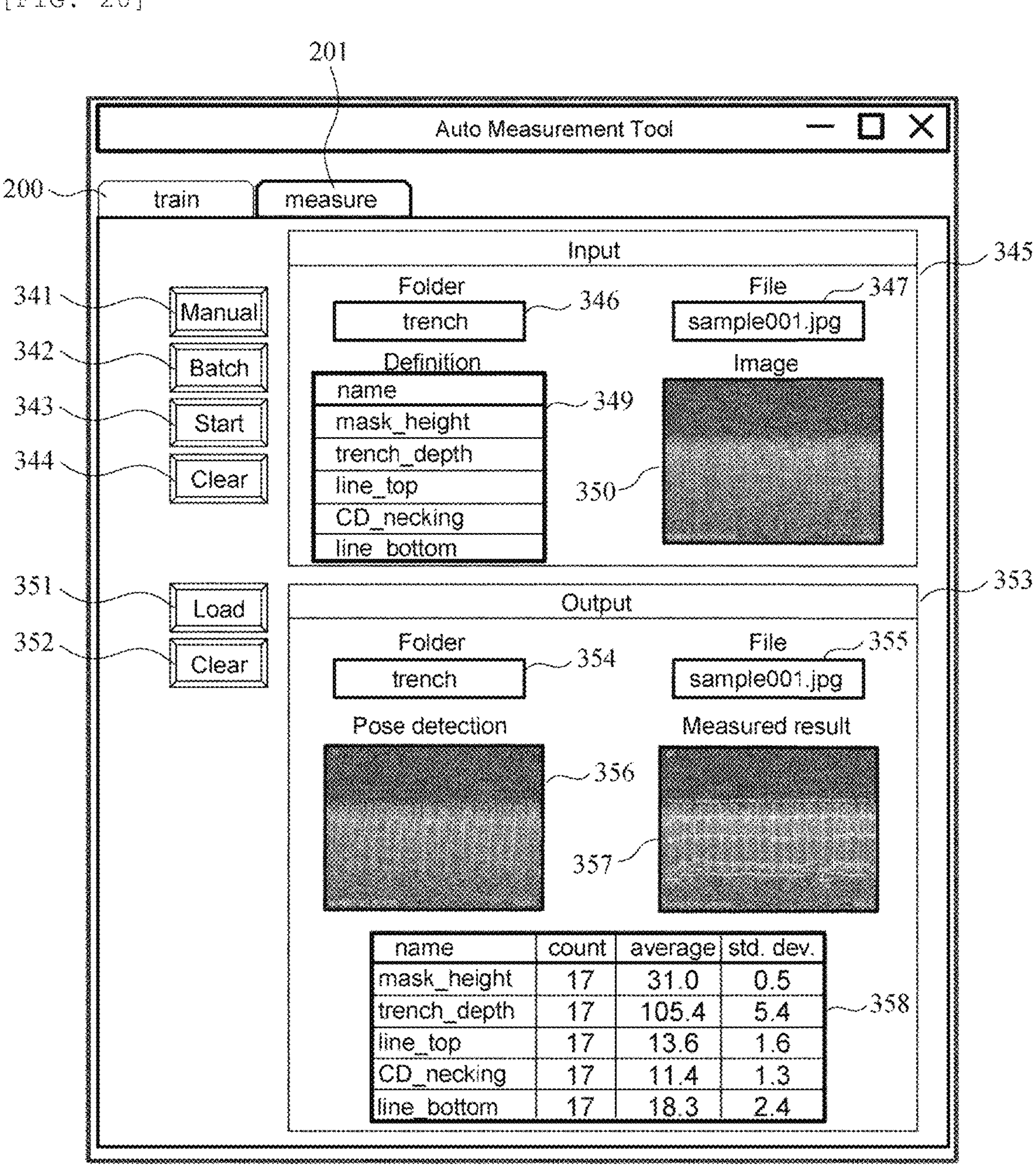
| name | count | average | std. dev. |
|---|---|---|---|
| mask_height | 17 | 31.0 | 0.5 |
| trench_depth | 17 | 105.4 | 5.4 |
| line_top | 17 | 13.6 | 1.6 |
| CD_necking | 17 | 11.4 | 1.3 |
| line_bottom | 17 | 18.3 | 2.4 |

[FIG. 21]
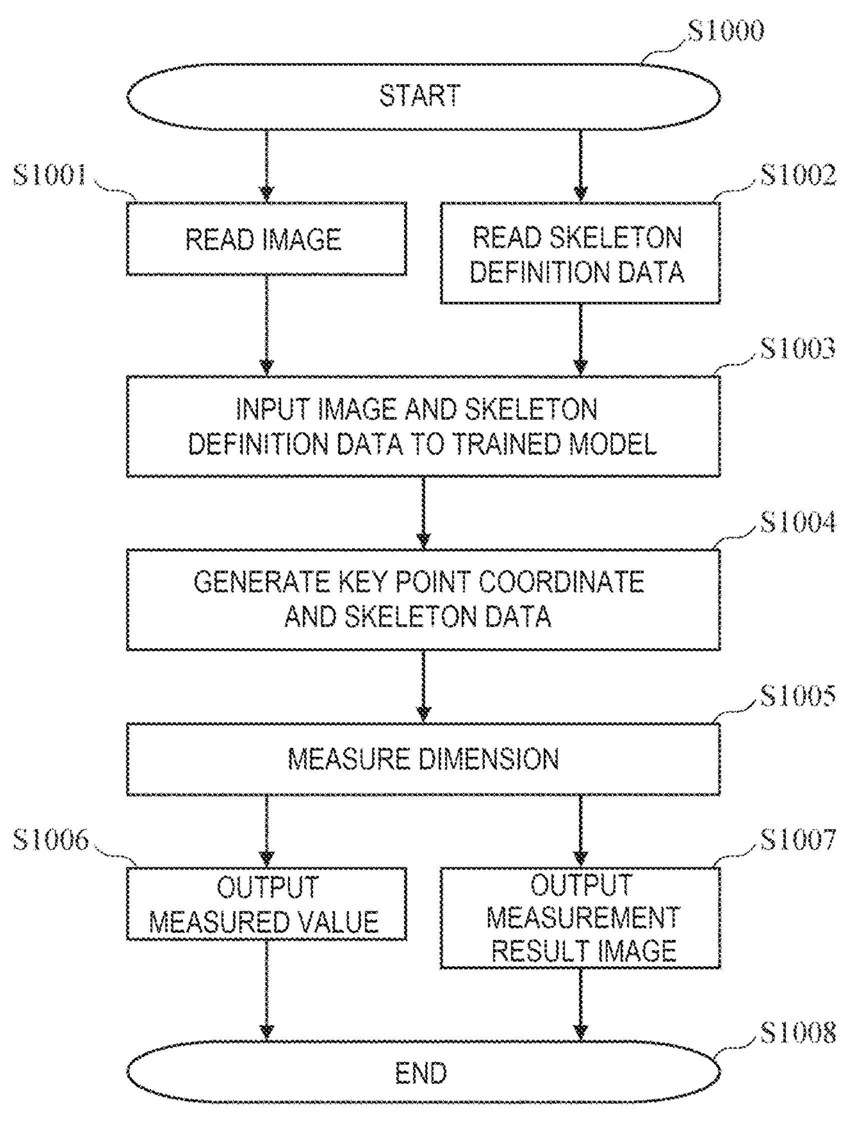

[FIG. 22]
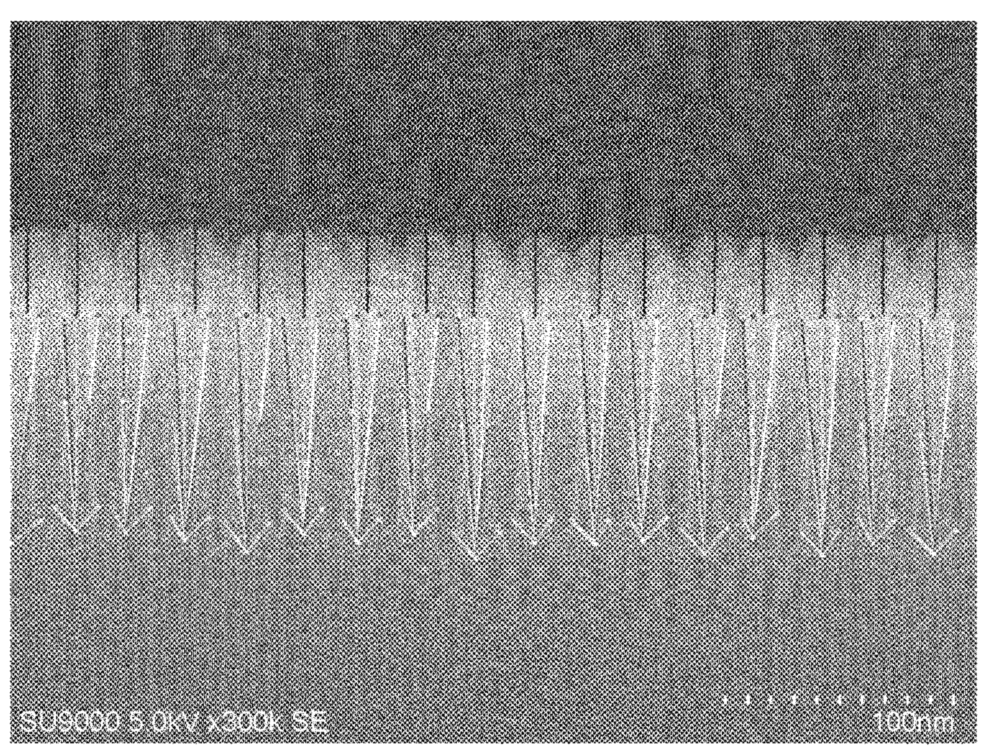

[FIG. 23]
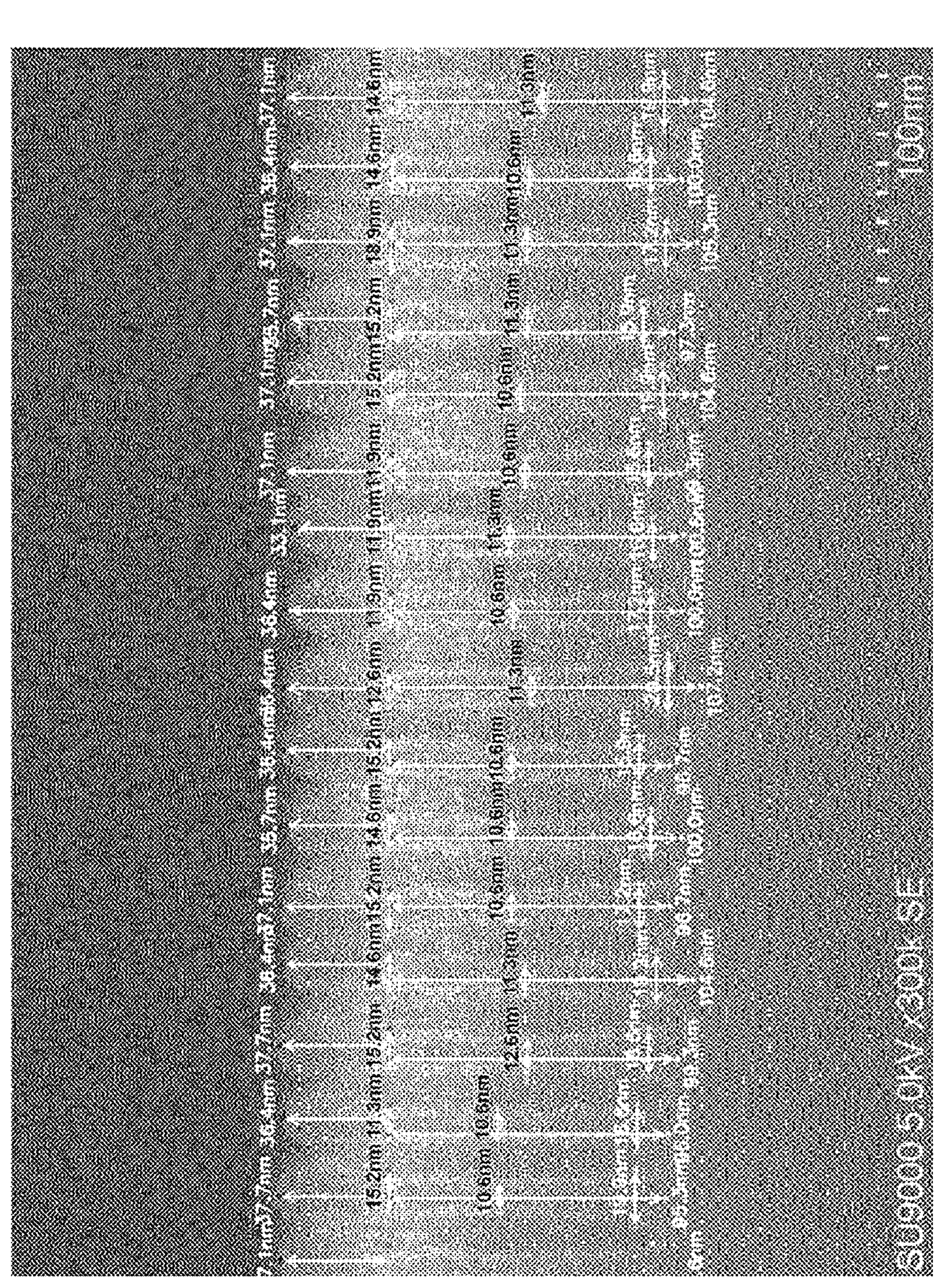

[FIG. 24]
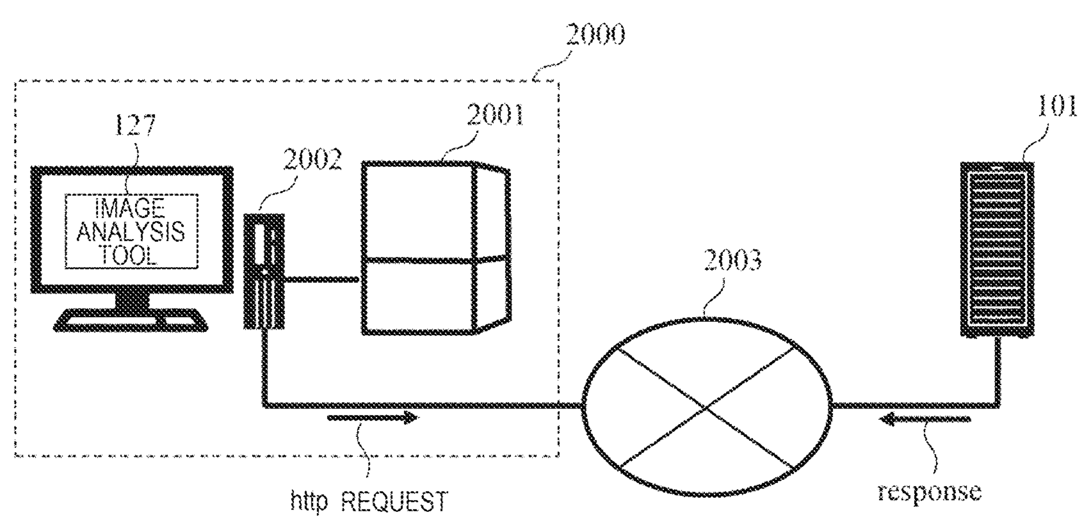

[FIG. 25]
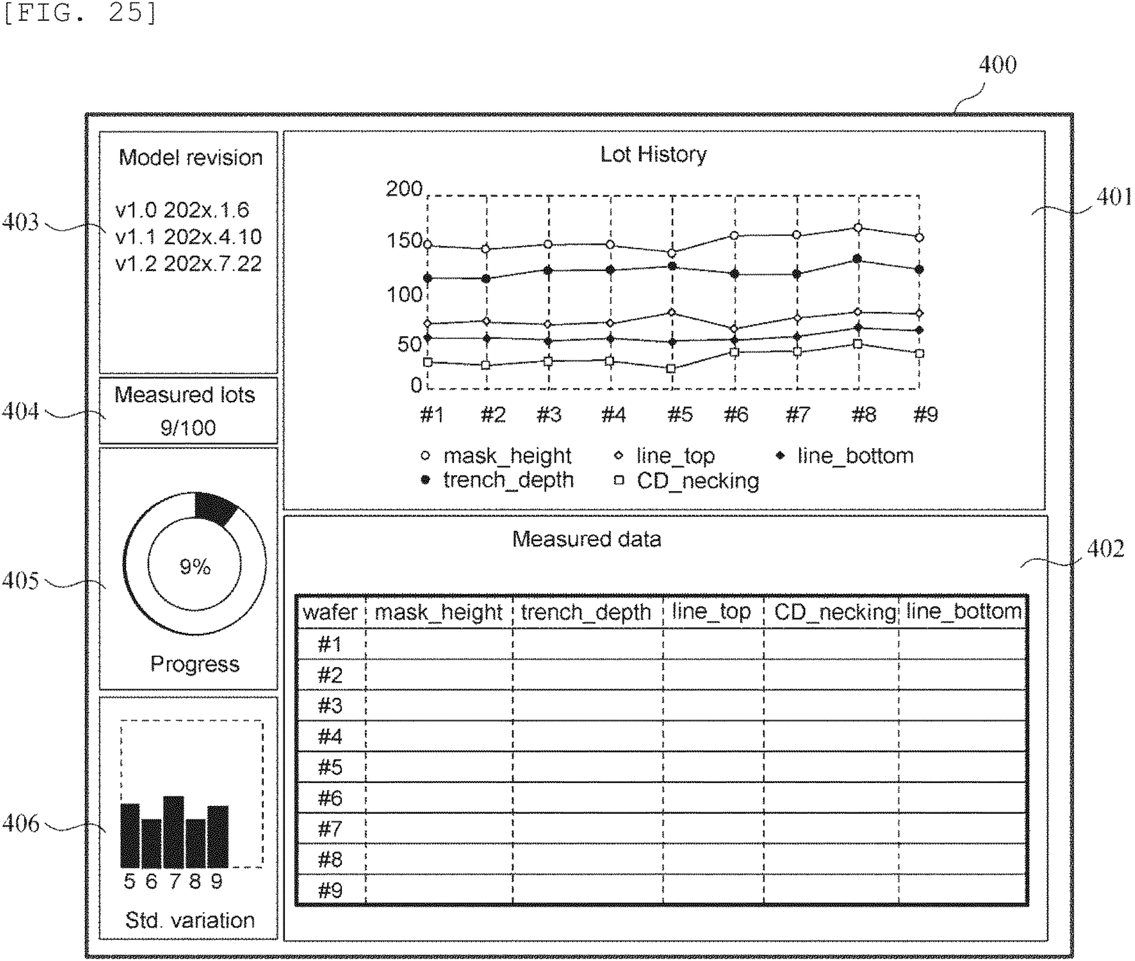

COMPUTER SYSTEM, DIMENSION MEASURING METHOD, AND SEMICONDUCTOR DEVICE MANUFACTURING SYSTEM

TECHNICAL FIELD

The present disclosure relates to a computer system, a dimension measuring method, and a semiconductor device manufacturing system for measuring a dimension from an image representing a device processing result.

BACKGROUND ART

In recent years, in order to improve performance of a semiconductor device, a new material is introduced into the semiconductor device, and at the same time, a structure of the semiconductor device becomes three-dimensional and complicated. At present, processing for an advanced semiconductor device requires nanometer-level accuracy. Therefore, a semiconductor processing apparatus needs to be able to process various kinds of materials into various shapes with extremely high accuracy, and is inevitably an apparatus having many control parameters (input parameters).

In an etching apparatus as a representative processing apparatus, the number of setting items for controlling plasma discharge is 30 or more. When discharge performed with setting values of the setting items fixed is defined as one step, the processing progresses while sequentially switching steps having different setting values. In an advanced process, 10 steps or more are usually used in one processing step, 30 steps or more are used in some case, and in order to optimize the combination of steps and all the setting values in the steps, processing tests under several hundreds of conditions are performed. The number of engineers having know-how for bringing out apparatus performance and high apparatus operational skill is limited, and it is predicted that in the future, the number of cases where condition derivation and apparatus operation do not progress as scheduled is increased.

In particular, in order to construct a process for achieving a desired structure in a short period of time, it is necessary to retrieve a similar structure from existing huge experimental data and to construct a process by using the similar structure as a starting point, and at this time, it is necessary to measure a dimension from a scanning electron microscope (SEM) image in advance. Currently, dimension measurement is often performed manually, but when the dimension measurement is applied to the advanced process, the structure is complicated, and the number of measurement points per image increases, so that manual dimension extraction has reached its limit. Further, in the manual measurement, dependence of an operator for a measured value is generated. In an image in which a pattern is repeated in units of line/space, the measurement is performed for each of the patterns, so that there is a problem that a human error is added to a statistical amount of the measured value in addition to a process variation.

To solve these problems, PTL 1 discloses a measuring method and a measuring apparatus in which a contour line is obtained based on a luminance value of an image, and coordinate values of two points at an upper portion and a lower portion of a pattern cross-section are used to manually remove a signal of a white shadow portion peculiar to an SEM image, thereby obtaining a side wall angle with high accuracy.

PTL 2 discloses a measuring method and a measuring system in which an edge point is obtained based on a change in a luminance value of an SEM image, and a straight line that approximates each side of a pattern is found, thereby extracting an angle and a length of each side while reducing operator dependence.

PTL 3 discloses a measuring method and a measuring system in which object detection and semantic segmentation, each of which is one type of image recognition technique based on deep learning, are used to perform region division and division of a repeating unit pattern, and thereby detecting a contour line on which a measurement point necessary for the measurement is present, and measuring a dimension.

CITATION LIST

Patent Literature

PTL 1: JP2012-68138A
PTL 2: JP2002-350127A
PTL 3: JP6872670B

SUMMARY OF INVENTION

Technical Problem

The measuring methods described in PTL 1 and PTL 2 are based on an edge detection method using a luminance value, operations, for example, parameter tuning such as a threshold value or designation of an interface position based on visual determination is necessary for each image, and the measuring methods cannot be said to be methods suitable for automatic measurement. In order to achieve the automatic measurement that does not require visual adjustment, it is necessary to extract an appropriate contour of an object by recognizing a region of each object projected on an image, instead of a local luminance distribution. It is considered that image recognition having equal or higher performance than the visual inspection can be achieved by applying an image recognition technique using machine learning, in particular, deep learning.

Although the method disclosed in PTL 3 can achieve the automatic measurement, there are problems such as it is necessary to provide an object detection model for segmentation into a unit pattern and to train two models in total, or it is necessary to obtain a coordinate of a measurement point necessary for the measurement by post-processing based on contour line data.

The inventor has found that the problems described above can be solved by applying human pose estimation (HPE), which is one image recognition technique, to pattern recognition of a semiconductor image. An HPE model is a machine learning model for estimating a pose of a person in an image, and is mainly used in operation recognition of a pedestrian for an autonomous vehicle, object processing for a game device or an animation, and the like in the related art.

In the HPE model, the pose of the person is expressed by a combination of a plurality of line segments each of which is called a skeleton and which have different lengths and inclinations, and coordinates of base points (key points) at both ends of each line segment are used to describe the skeleton. Therefore, if the skeleton in the HPE model is appropriately set in accordance with a pattern shape of a dimension measurement portion of a semiconductor pattern, the key points described above can be used as base points during the dimension measurement of the pattern. On the other hand, since it is necessary to learn the measurement portion before training in the HPE model, when it is necessary to add a measurement portion after the training of the model, there is a new problem that it is necessary to describe the measurement portion to be added for all samples included in a training data set. When the number of samples is large, man-hours required for this correction become a heavy burden. Regarding this problem, as a result of consideration on a configuration of the data set to be used in the HPE model, the inventor has found a preprocessing method in which if the correction is performed for a part of the samples, the model can be trained using other samples together. By this preprocessing, the problem of the HPE model described above can be solved. In addition, by mixing a plurality of training data sets having different number of measurement portions to increase a scale of the data set, the accuracy of the model can also be improved.

An object of the disclosure is to provide a computer system, a dimension measuring method, and a semiconductor device manufacturing system for reducing man-hours required for data set correction that occurs when a measurement portion is added in a dimension measuring method.

Solution to Problem

In order to solve the above problems, the invention provides a computer system for extracting, from image data of a pattern, coordinate information on base points for measuring a dimension of a desired portion of the pattern, and measuring the dimension by using the coordinate information on the base points, the computer system includes a preprocessing unit configured to allow training, in a case where a sample in which coordinates of all of the base points are described and a sample in which coordinates of only a part of the base points are described are mixed in a training data set to be used in a learner, by matching all of the samples by setting a base point insufficient in annotation data as an insufficient measurement portion and shielding the insufficient measurement portion on the image data, for the sample in which coordinates of only a part of the base points are described, the preprocessing unit includes a learner in which a pose estimation model for outputting coordinate information on at least two of the base points as a training result is installed, the learner is trained in advance by using training data in which the image data is set as an input and the coordinate information on at least two of the base points is set as an output, and the computer system extracts the coordinate information on at least two of the base points and the dimension for new image data input to the learner.

Further, in order to solve the above problems, the invention provides a dimension measuring method of a computer system extracting coordinate information on base points for measuring a dimension of a desired portion of image data, and measuring the dimension by using the coordinate information on the base points, in which a preprocessing unit is provided which is configured to allow training by integrating, in a case where a plurality of pieces of training data having different number of measurement portions are included in a training data set, an image of the data in which the number of measurement portions is insufficient by setting an insufficient base point as an insufficient measurement portion and shielding a region assumed as the insufficient measurement portion, the preprocessing unit automatically designs a skeleton that includes at least two of the base points of the image data as key points, inputs image data to be measured into a pose estimation model trained to output coordinate information on each of the key points, and generates coordinate information on each of the key points of the input image data, the dimension is measured by using the coordinate information on the key points of the image data to be measured, and the pose estimation model is trained by using training data in which the image data is set as an input and the coordinate information on at least two of the base points is set as an output.

In addition, the invention provides a semiconductor device manufacturing system provided with a platform in which an application for extracting coordinate information on base points for measuring a dimension of a desired portion of image data, and measuring the dimension by using the coordinate information on the base points is installed, the application is configured to perform: a step of allowing training by integrating, in a case where a plurality of pieces of training data having different number of measurement portions are included in a training data set, an image of the data in which the number of measurement portions is insufficient by setting an insufficient base point as an insufficient measurement portion and shielding a region assumed as the insufficient measurement portion; a step of automatically designing a skeleton that includes at least two of the base points of the image data as key points, inputting image data to be measured into a pose estimation model trained to output coordinate information on each of the key points, and generating coordinate information on each of the key points of the input image data; and a step of measuring the dimension by using the coordinate information on the key points of the image data to be measured, and the pose estimation model is trained by using training data in which the image data is set as an input and the coordinate information on at least two of the base points is set as an output.

Advantageous Effects of Invention

Even in a case where a measurement portion is added after training a machine learning model for performing dimension measurement, it is not necessary to correct all samples, and man-hours for correction can be significantly reduced. In addition, past data set assets can be integrated for training. Problems, configurations, and effects other than those described above will be clarified by description of the following embodiments.

BRIEF DESCRIPTION OF DRAWINGS

FIG. 1 is a configuration diagram of a dimension measuring system according to Embodiment 1.

FIG. 2 is a diagram illustrating an internal configuration example of a server used in the dimension measuring system according to Embodiment 1.

FIG. 3 is a schematic diagram illustrating a configuration example of a machine learning model according to Embodiment 1.

FIG. 4 is a diagram illustrating examples of a measurement portion in a semiconductor pattern to be measured in Embodiment 1.

FIG. 5 is a flowchart illustrating a training process of the machine learning model according to Embodiment 1.

FIG. 6 is a schematic diagram illustrating a graphical user interface (GUI) screen of an image analysis tool to be used in manual measurement performed in an initial process of training.

FIG. 7 is a description example of measurement condition data.

FIG. 8 is a diagram illustrating a description example of annotation data.

FIG. 9 is a diagram illustrating skeletons and key points used in an HPE model according to Embodiment 1.

FIG. 10 is a diagram illustrating definition data of a skeleton structure used in the HPE model according to Embodiment 1.

FIG. 11 is a diagram in which a new measurement portion is added according to Embodiment 1.

FIG. 12 is a description example of measurement condition data created when the measurement portion is added in Embodiment 1.

FIG. 13A is a diagram illustrating a description example of annotation data for a sample in which a measurement portion is added, and FIG. 13B is a diagram illustrating a description example of annotation data for a sample in which no measurement portion is added.

FIGS. 14A and 14B illustrate a relation between a manually measured value and a coordinate value (an x coordinate in FIG. 14A, a y coordinate in FIG. 14B) which is estimated by using a regression formula for obtaining a coordinate of a new key point from a coordinate of a known key point according to Embodiment 1.

FIG. 15 is a cross-sectional SEM image in which local shielding masks are placed at positions at each of which it is estimated that a key point corresponding to the new measurement portion exists according to Embodiment 1.

FIG. 16 is a diagram illustrating skeletons and key points used in the HPE model when the measurement portion is added according to Embodiment 1.

FIG. 17 is a diagram illustrating skeleton definition data used in the HPE model when the measurement portion is added according to Embodiment 1.

FIG. 18 is a computer experiment result that shows a relation between a rate of the number of samples in which the measurement portion is corrected in a data set, and man-hours for correction and a measurement failure rate in Embodiment 1.

FIG. 19 is a diagram illustrating a configuration example of a GUI screen displayed on a terminal PC during training of a model.

FIG. 20 is a diagram illustrating a configuration example of a GUI screen displayed on the terminal PC when a dimension is measured by using a trained model.

FIG. 21 is a flowchart illustrating a process of inputting an image to the trained model and outputting a dimension value.

FIG. 22 is a diagram illustrating a result obtained by displaying, on image data, skeleton structures and key points obtained by newly inputting image data to the trained model.

FIG. 23 is a diagram illustrating a result obtained by displaying, on image data, measured values of dimensions obtained by newly inputting the image data to the trained model.

FIG. 24 is a diagram illustrating a configuration example of a semiconductor device manufacturing system using a charged particle beam device according to Embodiment 2.

FIG. 25 is a diagram illustrating a configuration example of a GUI screen of an image analysis tool in the system according to Embodiment 2.

DESCRIPTION OF EMBODIMENTS

A specific example of dimension measurement for image data of a semiconductor pattern using an HPE model will be described below. In the present description, the HPE model is also simply referred to as a pose estimation model.

(A) Embodiment 1

In the present embodiment, a configuration example of a dimension measuring system in which the HPE model is installed as a machine learning model will be described. In the dimension measuring system according to the present embodiment, training data of the machine learning model includes a cross-sectional SEM image which is image data of a dimension measurement object, and annotation data in which a coordinate of a base point (a key point) for a measurement portion of the cross-sectional SEM image is described. In a training step, the HPE model learns a key point position by receiving the training data described above together with a skeleton definition file. Here, the skeleton is not necessarily the same as the measurement portion, but both ends of the skeleton are always key points.

In an inference step, a key point is estimated for a provided input image by using the trained HPE model. In a measurement step, key point coordinates of both ends of each measurement portion are obtained from an estimated key point coordinate group, and a dimension of a measurement portion designated in advance is automatically measured.

Configuration Example of Dimension Measuring System

First, a configuration of a dimension measuring system will be described. FIG. 1 is a diagram illustrating a configuration example of the dimension measuring system. A dimension measuring system 110 includes an evaluation device 100, a server 101, a database 102, and one or more input and output devices 103, and the individual parts are connected via a network. A processing device 111 may be or may not be connected via the network. When the processing device 111 is connected to the network, the processing device 111 transmits processing condition data and the like to the evaluation device 100 via the network.

Each input and output device 103 is a terminal provided with a display and a keyboard, or a PC or a tablet incorporating a storage medium, and is used, as illustrated in FIG. 1, by a system operator such as a measurement engineer who uses the evaluation device 100, a process engineer who uses the processing device 111, and a programmer who uses the server 101 or the database 102. In the following description, when the "input and output device 103" is described, the "input and output device 103" means a generic term for an input and output device 103-1, an input and output device 103-2, and an input and output device 103-3, and it is intended to describe a feature common to all the input and output devices.

The processing device 111 is a device that processes a semiconductor or a semiconductor device including semiconductor. A processing content of the processing device 111 is not particularly limited. For example, a lithography device, a film forming device, and a pattern processing device are included. Example of the lithography device includes an exposure device, an electron beam lithography device, and an X-ray lithography device. Examples of the film forming device include chemical vapor deposition (CVD), physical vapor deposition (PVD), a deposition device, a sputtering device, and a thermal oxidation device. Examples of the pattern processing device includes a wet etching device, a dry etching device, an electron beam processing device, and a laser processing device.

The evaluation device 100 is a device that outputs a cross-sectional image which is an evaluation result for a sample obtained from a wafer processed by the processing device 111, and examples thereof includes an SEM, a transmission electron microscope (TEM), a processing dimension-measuring device using an optical monitor, and an FIB device. A shape of the sample obtained from the wafer may be a shape of a sample (a coupon) obtained by cleaving the wafer and cutting out a part of the wafer, or a shape of the entire wafer. In addition, a lamella preparation device may be provided in the middle of carrying the wafer from the processing device 111 to the evaluation device 100, a part of a semiconductor or a semiconductor device may be extracted as a fragment by the device, and the extracted sample may be used as a sample to be measured.

The server 101 can be implemented by a usual computer, and an OS, a framework, a library, a program language, a model, and the like necessary for deep learning are installed therein. It is desirable that a high-performance graphics processing unit (GPU) is provided in order to perform training of a model in a short time. The training and inference in the model are performed by logging in to the server 101 from the input and output device 103. An image analysis tool used for manual measurement may be installed in the server 101 or may be installed in any one or all of the input and output device 103. When the image analysis tool is installed in the server 101, an operation of the tool is performed by using the input and output device 103.

The database 102 is an external storage device that stores a captured cross-sectional image that is input data, annotation data, skeleton definition data, model parameters that represent a trained model, a measurement result, and the like.

Regarding an image which is obtained from the evaluation device 100 and which is stored in the database 102, the measurement engineer measures a dimension by using the image analysis tool from the input and output device 103, and stores a measurement result in the database 102. In addition, the process engineer performs, by using the input and output device 103, the training of the model on the server 101 based on the measurement result. After the model is trained, the image obtained from the evaluation device 100 is directly input to the trained model on the server 101, and the dimension is automatically measured. If necessary, the programmer performs, for example, correction of a program by using the input and output device 103.

The above operations do not necessarily need to be shared by the measurement engineer, the process engineer, and the programmer, and it is needless to say that a single system operator may execute the above operations independently.

Internal Configuration Example of Server 101 in Which Dimension Measurement Function is Achieved FIG. 2 is a diagram illustrating an internal configuration example of the server 101 in which a dimension measurement function is achieved according to the present embodiment. In a housing of the server 101, an interface 115, a processor 116, a nonvolatile memory (ROM) 117, a volatile memory (RAM) 118, a storage 126, and the like are stored. An input of the image data or the training data to the server 101 or an output of a dimension measurement result from the server 101 is executed by the input and output device 103 via the interface 115. The image data that is input data, the annotation data, the skeleton definition data, the model parameters that represent the trained model, and the measurement result are stored in the database 102, and are read out when necessary. Although not illustrated in FIG. 2, an input and output device such as a mouse for operating a GUI screen of a manual image analysis tool 127 and a keyboard for inputting various setting values is provided in the input and output device 103.

The storage 126 stores the image analysis tool 127 and a dimension measurement software 128 having the dimension measurement function according to the present embodiment. The dimension measurement software 128 is loaded into the RAM 118 as necessary. The processor 116 achieves the dimension measurement function according to the present embodiment by executing the dimension measurement software 128. The image analysis tool 127 is a tool for outputting measurement condition data necessary for creating the annotation data constituting the training data, and has a function of calculating a coordinate of a specific portion of an image by a pixel calculation process or calculating a distance between coordinates.

Further, the dimension measurement software 128 according to the present embodiment mainly includes a data conversion unit 123, an HPE model unit 124, and a dimension measuring unit 125, and these units are incorporated in the dimension measurement software 128 in a form of a software module. FIG. 2 illustrates a state in which the data conversion unit 123, the HPE model unit 124, and the dimension measuring unit 125 are loaded in the RAM 118.

Example of HPE Model

FIG. 3 is a diagram illustrating an example of the HPE model used in the server 101. The HPE model in FIG. 3 has a neural network structure 10, and pixel information input to an input layer is sequentially propagated to an intermediate layer and an output layer and calculated, and thereby coordinates of key points are output from the output layer. The intermediate layer has a structure in which a plurality of layers such as a convolutional layer and a pooling layer are repeated. Although a basic structure of the HPE model according to the present embodiment has been described above, a specific layer structure is different depending on the details of a model to be employed.

When the HPE model is trained, a parameter of the intermediate layer is adjusted such that an error between the output coordinate of the key point and the annotation data that is a ground truth is minimized. The HPE model illustrated in FIG. 3 is installed in the HPE model unit 124 in FIG. 2, and a main part of the dimension measurement software 128 is stored in the storage 126 in FIG. 2. The HPE model in FIG. 3 is loaded in the RAM 118 during training and inference, and is executed by the processor 116.

In the following description, a learner means the HPE model unit 124 incorporated in the dimension measurement software 128 as a software module, but other implementations in addition to the software module are also applicable. In addition, although the HPE model is constructed by using the neural network 10 in the present embodiment, the invention is not limited thereto, and a machine learning model such as a pictorial structure model may also be used.

First, a procedure until the HPE model is trained will be described.

<Procedure of Creating Training Data Set of HPE Model>

First, a method for designating a measurement portion will be described with reference to FIG. 4. FIG. 4 is an image of a semiconductor pattern obtained by cropping a part of a cross-sectional SEM image of a semiconductor to be measured in order to describe the measurement portion. A target structure of the cross-sectional SEM image includes a structure in which a mask portion (mask) 40 made of silicon oxide is formed on a silicon substrate portion (substrate) 41, and then a trench pattern is formed. In FIG. 4, four portions, that is, a mask height 43, a trench depth 44, a line top 45, and a CD necking 46 are shown as examples of the measurement portion. In FIG. 4, eight white circles 42 are base points corresponding to ends of the measurement portions, and are hereinafter also referred to as key points. Coordinates in FIG. 4 are coordinate values of the respective key points, and regarding coordinate axes, a horizontal direction is set to an x axis and a vertical direction is set to a y axis.

In order to train the HPE model, it is necessary to create the "measurement condition data" in which names of the key points and the coordinate values of the key points included in respective images are described and the "skeleton definition data" in which a definition of a skeleton is described. Thereafter, the measurement condition data is converted into annotation data that can be read by the HPE model.

FIG. 5 is a flowchart illustrating a process from reading of an input image to training of a model, which is executed by the server 101 in Embodiment 1. From only S301 to S303 are accompanied by manual operations, the coordinate values of the respective key points are obtained by using some software such as the image analysis tool or a graphic tool after S304 so as to create the "measurement condition data" while describing the names of the key points. Hereinafter, an example to be performed by the image analysis tool will be presented, and a method for creating the measurement condition data will be described.

FIG. 6 is a configuration example of an add-in window 15 displayed on the image analysis tool. When a loading button 20 at an upper part of FIG. 6 is pressed, candidates of the image are displayed in a thumbnail manner on the GUI, and the system operator selects an image to be manually measured among the candidates. An image deleting button 21 is used when it is desired to cancel the selected image. A magnification at the time of image capturing is input to a magnification cell 22. This value is used to convert a measured dimension in a pixel unit to an actual dimension. The above operation corresponds to S301 in FIG. 5.

Next, in order to illustrate an operation corresponding to S302, various buttons illustrated in a middle part of FIG. 6 will be described. The buttons in the middle part of FIG. 6 are used when creating "measurement portion setting data" for setting a measurement environment of the image analysis tool. The measurement portion setting data is data in which a correspondence relation of a name, a unit, and a color used for display of a measurement portion, which is created by the following operations, is stored. New measurement portion setting data is generated by pressing a newly generating button 23, the generated measurement portion setting data is loaded by pressing a loading button 24, and the created measurement portion setting data is saved by pressing a save button 25. When the measurement portion setting data is newly generated, first, a name of the measurement portion is input to a name cell 26, and then a unit of the dimension is input to a unit cell 27. A color that is not used is automatically set as a candidate in a color cell 28. When a creating button 29 is pressed, a created measurement portion is registered in a measured value list 31. When a measurement portion is desired to be deleted, a corresponding line is selected in the measured value list 31, and then a measurement portion deleting button 30 is pressed. In the measured value list 31, a display color, a name, a unit, a count of the measurement, an average value of the dimension, a standard deviation of the dimension, and the like are displayed.

Next, a procedure of the manual measurement will be described. After a desired image is displayed by pressing the image loading button 20, the operator operates the various buttons shown in the middle part of FIG. 6 and a mouse to measure a dimension of a measurement portion in the image. All portions shown in the image may be set as portions to be manually measured, and only a predetermined number of portions may be measured.

First, when the newly generating button 23 is pressed, the name cell 26 and the unit cell 27 are activated to be in an input enable state, and the name of the measurement portion and the unit of the dimension are input. Next, the mouse is operated to move a cursor or a pointer to any start point and any end point of a display image, and the mouse is clicked at these two portions. When a first mouse click event is detected, a coordinate of a clicked portion is determined as the start point in a pixel unit, and when a second mouse click event is detected, a coordinate of a clicked portion is determined as the end point in a pixel unit. A dimension between the start point and the end point is calculated based on a distance between the two coordinates, and is displayed in the measured value list 31. When the operator presses the creating button 29 after the display, the calculated dimension value, the count, the average value, and a value of the standard deviation in the measured value list 31 are registered in the measured value list 31. Every time the start point and the end point are newly added, the count, the average value, and the value of the standard deviation in the measured value list 31 are updated.

When measuring a first image, the measured value list 31 is blank at an initial stage, but regarding a second and subsequent images, after a name of a target measurement portion is selected from the measured value list 31, a start point and an end point of the measurement portion on the image may be clicked. When the measurement ends, a save button 32 in a lower part is pressed. "Measured value data" (a CSV file) and the "measurement condition data" (a text file) corresponding to the measured value list are output. In order to refer to or correct previously stored measured value data, a loading button 33 is pressed to call the data. The above is the operation performed in S302 in FIG. 5. If a manual measurement operation is completed for all the images, an operation of creating the measurement condition data is completed, and if the manual measurement operation remains, the process returns to S301 (S303). The above operation is performed by the measurement engineer by using the image analysis tool 127 via the input and output device 103.

Next, in S304, the system reads all the created measurement condition data, and determines whether the measurement portions are common to all samples. First, a flow for a case where the measurement portions are common to all sample will be described. FIG. 7 is an example of the measurement condition data output by the manual image analysis tool by performing the manual measurement on the measurement portions in FIG. 4. In this example, a JSON format is adopted, and other formats may be used. In this file, a "name" is a name of a measurement portion input by a measurement tool. Next, in a "measurement List", a measurement name is listed in the "measurement Name", and the coordinate values of the start point and the end point are listed in a "position List". L1, L2, and the like therein are names automatically assigned by the manual image analysis tool in order to distinguish the measurement portions, and are not used in the annotation data for the training of the HPE model.

Next, the read measurement condition data is converted into annotation data of a format corresponding to the HPE model (S305). The conversion is automatically performed by the data conversion unit 123 in FIG. 2. FIG. 8 illustrates an example of the annotation data. In the present embodiment, the JSON format to be usually used in a data set for human pose estimation is assumed. The mask portion and the substrate portion are described as separated objects. In this format, an "x coordinate", a "y coordinate", and a "visibility" are listed in order of key point number for each object. Although it is necessary to uniquely determine the key point number, here, a rule is used in which the measurement portion in a vertical direction is arranged first, the measurement portion in the horizontal direction is arranged later, and the start point is arranged first, the end point is arranged later. That is, in the example of FIG. 4, the order of the measurement portions is the mask height, the trench depth, the line top, and the CD necking. The visible degree is 2 when the key point is completely visible, and is 0 when the key point is completely invisible. The "id" is a number for distinguishing the objects, and is automatically assigned with sequential numbers according to the number of images and the number of objects included in the respective images. In a human pose model, a plurality of types of objects cannot be handled, so that each of the mask portion and the substrate portion is handled as an object having eight key points, and instead, a key point which does not exist is set to be invisible. For example, with respect to a mask portion having id=1000, key points of No. 2 to No. 7 are set to be invisible, and a dummy value (here, 0 is used) is described for the coordinate. A file in which the above information on all the images is arranged together with image file names is referred to as the annotation data.

Next, in S302 of FIG. 5, when only a predetermined number of measurement portions in the cross-sectional SEM image are manually measured, a mask for shielding a non-measurement region in the image is added in S306. This is a treatment for preventing the image and the annotation data from being contradictory to each other. A shape of the mask may be any shape, but if the mask is a rectangular mask for covering the entire non-measurement region, it is easy to designate the region.

A training data set includes the cross-sectional SEM image to which the mask for shielding is added and the annotation data illustrated in FIG. 8 (S307).

In parallel with the configuring of the training data set, in S308, a skeleton corresponding to a set of provided key points is designed, and the "skeleton definition data" is created. FIG. 9 is an example of a skeleton structure automatically designed based on the measurement condition data in FIG. 7. In the training of the model, FIG. 9 itself is not used, and the skeleton definition data that is a text file to be described later is used. White lines 50 each connecting the key points 42 to each other in FIG. 9 are referred to as the "skeletons". A method of connecting the key points (hereinafter referred to as a skeleton design rule) is any method, but in order to prevent the skeleton structure from being separated when a local mask to be described later is added, a radiation type structure in which one key point is connected to all other key points is employed in each of the mask portion (including key points 0 and 1) and the substrate portion (including key points 2 to 7). The number of the key points, which are base points, is 8 per unit pattern including the mask portion and the substrate portion, and the number of the skeletons are set to 6. Consecutive numbers 0 to 7 and consecutive numbers (0) to (5) are automatically assigned to the key points and the skeletons, respectively. The automatic design and the creation of the skeleton definition data described above are also automatically performed by the data conversion unit 123 in FIG. 2 based on the skeleton design rule.

FIG. 10 illustrates the skeleton definition data describing the skeletons illustrated in FIG. 9, and illustrates an example of a case where the skeleton definition data is described in a dictionary format. 6 pairs of numerals corresponding to key limbs_points are key point numbers of the start points and the end points of the skeletons arranged in order of the skeleton number, and 8 numerals corresponding to key joint_indices are key point numbers.

When the HPE model is trained (S314), the training data set configured in S307 and the skeleton definition data created in S308 are input to the model. The training ends when the training reaches a predetermined number of times of repetition (S315).

The above is a flow for creating a data set for the training from zero, and this flow is performed from the beginning every time the device to be measured or the measurement portion is changed. On the other hand, although the device to be measured is the same, it may be necessary to increase the number of measurement portions beyond the number of the initially set measurement portions after the model is trained. FIG. 11 illustrates an example in which 47 line bottom is added as a new measurement portion when measurement portions in the related art are the portions illustrated in FIG. 4. In order to train the model corresponding to the measurement portions in FIG. 11, it is necessary to correct the existing measurement condition data, and a usual method is to add the line bottom to the measured value list 31 of the image analysis tool illustrated in FIG. 6 and to correct the measurement condition data for all the images. Although this method is reliable, man-hours for correction corresponding to the number of images is required.

In the present embodiment, in order to reduce the man-hours required for the correction of the measurement condition data, a measurement condition file is corrected for only a part of the images rather than all the images, and a function for enabling the use of the existing measurement condition data for other images is incorporated in the system. Hereinafter, a process to be performed by the system when it is determined in S304 of FIG. 5 that the measurement portions are not common will be described.

First, in S309 of FIG. 5, the annotation data is created. FIG. 12 is an example of the measurement condition data created by the image analysis tool when the measurement portion line bottom is added. As compared with data in the related art, information on the line bottom is added. On the other hand, for a sample to which the measurement portion is not added, the measurement condition data is as illustrated in FIG. 7, and the information on the line bottom lacks. When both of the above are integrated, it is necessary to align with the format of FIG. 12 in which the number of measurement portions is large.

FIG. 13A illustrates a portion of the annotation data describing a sample in which a measurement portion is added, and FIG. 13B illustrates a portion of the annotation data describing a sample in which the measurement portion is not added. For the sample in which the measurement portion is added, the information on the added measurement portion (indicated by bold characters in FIGS. 13A and 13B) can be acquired from the measurement condition file (FIG. 12). On the other hand, for the sample in which the measurement portion is not added, since the information on the added measurement portion (indicated by bold characters in FIGS. 13A and 13B) is unknown, a dummy value (0 is used in the example in FIGS. 13A and 13B) is input for the coordinate value of the corresponding key point, and the visibility is set to 0.

Next, in order to match with the description of the annotation data, a local mask for shielding a region where a key point to be added is assumed to exist is added to the cross-sectional SEM image of the sample in which the measurement portion is not added. That is, an obstacle is artificially placed such that the key point to be added cannot be seen in the image. The above has the same purpose as that of the shielding of the non-measurement region. However, a coordinate of the key point to be added is unknown, so that estimation based on a regression formula is performed (S310). As the regression formula, a linear regression, a machine learning model, a neural network, or the like may be used. In the creation of the regression formula, first, coordinate values of all the key points are collected from the measurement condition file of the sample in which the measurement portion is added, and are set as the training data, and a regression formula is trained in which coordinates of existing key points are set as an input, and a coordinate of the added key point is set as an output. The obtained regression formula is applied to the sample in which the measurement portion is not added, and the unknown coordinate of the key point is estimated based on the coordinates of the existing key points.

FIGS. 14A and 14B illustrate a result of comparison between a coordinate value estimated by applying the trained regression formula to a certain sample in which no measurement portion is added, and a coordinate value measured manually. In FIG. 14A, an x coordinate is shown, and in FIG. 14B, a y coordinate is shown. An estimated value that is matched extremely well with a manually measured value is obtained. The reason why such an estimation with high accuracy is possible is that, in the measurement of the cross-sectional SEM image, the shapes of the measurement targets are similar, and a correlation between the key point coordinates is relatively large. In the example of FIGS. 14A and 14B, an estimation error in the x coordinate is larger than that in the y coordinate, but is about 10 pixels at the maximum.

FIG. 15 is an image obtained by adding local masks, each of which is added with the coordinate value estimated as the added key point as a center, to the cross-sectional SEM image of the sample in which the measurement portion is not added in S311 of FIG. 5. Black regions at both ends of the image are regions that are not measured at the time of the manual measurement. A shape of the local mask may be any shape, and may be any of a circle, a square, and a rectangle. Here, an example in which the local mask has a circle shape is shown. It is desirable that a size of the circle is a value larger than an estimation error of the regression formula (a radius of 15 pixels is used in FIG. 15). For the sample in which the measurement portion is not added, the image in which the local masks are added is used as the training data set. On the other hand, in the cross-sectional SEM image of the sample in which the measurement portion is added, the local mask is not added, and only rectangular masks at both ends of the image for shielding the non-measurement region are added. The training data set is configured by the cross-sectional SEM image in which the masks for shielding are added and the annotation data in FIGS. 13A and 13B (S312).

In parallel, the skeleton definition data is created in S313. FIG. 16 is a skeleton structure corresponding to FIG. 11 in which the measurement portion is added. As compared with FIG. 9, key points 51, 52 and skeletons 53, 54 are added. Since it is necessary to match with a data set, in which the number of measurement portions is large, in the integrated data sets, FIG. 17 corresponding to FIG. 16 is created as the skeleton definition file. As compared with FIG. 10 before the addition, 2 skeletons are added in the key limbs_point, and 2 key points are added in the key joint_indices.

In the training of the HPE model (S314), the training data set configured in S312 and the skeleton definition data created in S313 are input to the model. The training ends when the training reaches a predetermined number of times of repetition (S315).

In addition, in the system described in the present embodiment, in a case where a measurement portion is newly added, the training can be performed even when there is one sample for which the measurement condition file is corrected, but it is needless to say that the accuracy of the trained model decreases. In order to investigate a rate of the allowable number of corrected samples, a result obtained by performing computer experiments while variously changing a correction rate is illustrated in FIG. 18. FIG. 18 is a relation between the correction rate (a correction ratio), and man-hours and a failure rate of the measurement (a ratio of the number of portions that cannot be measured to the total number of measurement portions) when man-hours in a case of correcting the measurement condition file for all the samples is set as 100%. The man-hours for correction and the measurement failure rate are in a trade-off relation with respect to the correction ratio. In this example, when a practical failure rate (for example, less than 1%) is considered, the correction ratio can be reduced to ¼. That is, if the measurement condition file is corrected for about ¼ of all the samples, it is possible to train a model with sufficient accuracy. When the local mask is not added, a result is obtained that the failure rate is further increased, so that the addition of the local mask is essential.

Referring again to the flowchart in FIG. 5, a series of processes of S305 to S315 described above are automatically performed by the system according to an instruction issued by the process engineer via the GUI screen of the input and output device 103. FIG. 19 is a diagram illustrating an example of a GUI screen for performing an operation necessary for the training of the HPE model in the present embodiment, and the GUI screen is displayed on the input and output device 103. The GUI screen illustrated in FIG. 19 is configured to switch a training screen to be used during training and a measuring screen to be used during measurement execution by using tabs, and when a training tab 200 displayed as "train" is selected, the present screen is displayed. A button group for instructing the module execution and the model training is set in an upper part, and a terminal output screen (a terminal window) 206 is set in a lower part.

First, in order to designate a folder in which the training data is stored, an input button (a training data storage folder designating button) 210 is pressed to designate a folder. A name of the designated folder is displayed in a folder name cell 213. Next, in order to designate a folder for storing the trained model after the training, an output button 211 is pressed to designate the folder. A name of the designated folder is displayed in a folder name cell 214. A clear button 212 is pressed in order to change the name of the designated folder. A training start button 204 is pressed to start the training of the model. A status cell 205 indicating a status is displayed beside the training start button 204. When "Done" is displayed in the status cell 205, a training step of step S306 is completed. Further, meanings of a conversion module executing button 202 and an automatic skeleton design module executing button 203 displayed in FIG. 19 will be described in Embodiment 2 or Embodiment 3, but in the dimension measuring system according to the present embodiment, since functional blocks that achieve processes of the buttons are not incorporated in the dimension measurement software 128, the dimension measuring system does not operate even when the buttons are pressed.

<Automatic Dimension Measurement Process Using Trained Model>

Next, a method for performing the dimension measurement by inputting a new image to the trained model will be described. In the following description, it is assumed that an unmeasured cross-sectional SEM image is stored in a folder of the storage 126. The dimension measurement for the new image is executed by the server 101. In the HPE model for which the training is completed, parameters constituting the layers of the neural network 10 illustrated in FIG. 3 are optimized, and the optimized parameters are stored in the storage 126 in the server 101. During execution of inference, the parameters are loaded in the RAM 118, and are referred to by the processor 116, and thereby key point coordinates serving as the base points for the measurement and a dimension value are calculated.

FIG. 20 is an example of a GUI screen of the automatic measurement tool to be displayed on the input and output device 103 of FIG. 1 when automatic measurement is performed after the training of the model is completed. The GUI screen in FIG. 20 includes an input panel 345 on an upper right side of the screen, an output panel 353 on a lower right side of the screen, and various operation buttons (buttons 341, 342, 343, 344, 351, 352) arranged on a left side of the screen. Information on the selected image or folder is displayed on the input panel 345, and a measurement result is displayed on the output panel 353. The GUI screen is configured to switch the training screen to be used during training and the measuring screen to be used during measurement execution by using tabs, and when a measuring tab 201 displayed as "measure" is selected, the screen in FIG. 20 is displayed.

Regarding the various operation buttons, the manual button 341 is used when images, which are desired to be measured, are to be selected one by one. The batch button 342 is used to designate a folder when all images in the folder are to be measured at a time. When the measurement start button 343 is pressed, the measurement is started, and when the measurement is finished, the measurement result is automatically stored. When the image is reselected, the clear button 344 is pressed to delete information displayed on the input panel 345. When the measurement result loading button 351 is pressed, the measurement result is loaded and displayed, and when the measurement result display clear button 352 is pressed, the display is deleted.

On the input panel 345, a name of a folder for storing a target image is displayed in a folder name cell 346. When the manual button 341 is pressed, a name of a designated image is displayed in a file name cell 347, and when the batch button 342 is pressed, a name of a first image is displayed in the file name cell 347. When the name of the designated folder and the name of the file are to be changed, the name of the designated folder and the name of the file are deleted by pressing the clear button 344 and are re-designated. In a definition window (a measurement portion definition list) 349, definition information on the measurement portions to be provided to the image stored in the folder is displayed. When the manual button 341 is pressed, the name of the designated image is displayed on an input image panel 350, and when the batch button 342 is pressed, the name of the first image is displayed.

On the output panel 353, a name of a folder for storing a target image is displayed in a folder name cell 354. When the manual button 341 is pressed, a name of a designated image is displayed in a file name cell 355, and when the batch button 342 is pressed, a name of a first image is displayed in the file name cell 355. The detected skeleton structure is displayed on the input image in a pose detection screen (a pose estimation result displaying panel) 356, and the measured dimension value is displayed on an input image on a dimension measurement result displaying panel (the measuring screen) 357. When the batch button 342 is pressed, a result for the first image is displayed on the pose detection screen 356 and the measuring screen 357. In a dimension measurement result cell 358, a count, an average value, and a standard deviation for each measurement portion are displayed. When the manual button 341 is pressed, a result for the designated image is displayed, and when the batch button 342 is pressed, a result for the first image is displayed.

FIG. 21 shows a flowchart of a process of performing the dimension measurement by inputting a new image to the trained model. When the system operator presses the measurement start button 343 in FIG. 20, the processor 116 starts a process according to the flowchart in FIG. 21.

(i) Steps S1001 to S1003

The dimension measuring unit 125 reads an image (step S1001) to be dimension-measured, which is provided by the operator, and inputs the image and the skeleton definition data (step S1002) created during training to the trained model (step S1003). The image acquired by the dimension measuring unit 125 (provided by the operator) is one image when the manual button 341 shown in FIG. 20 is pressed, and is an image file (a plurality of images that are collectively input) stored in the folder corresponding to the name displayed in the folder name cell 346 shown in FIG. 20 when the batch button 342 is pressed.

(ii) Step S1004

After the image is input, the dimension measuring unit 125 outputs the key point coordinates and the skeleton structure which are inference results of the trained model (step S1004).

(iii) Step S1005

The dimension measuring unit 125 calculates the dimension of each measurement portion based on the key point coordinates (step S1005).

(iv) Step S1006

The dimension measuring unit 125 displays the measurement result including statistical data on the GUI screen of the input and output device 103, and further outputs the measurement result in a predetermined file format (step S1006).

(v) Step S1007

The dimension measuring unit 125 superimposes the skeleton structure and the measured values on the input image, and outputs the image data displayed in a superimposed manner (step S1007). The output measurement result file and image data are stored in a predetermined folder in the storage 126. In the example of the GUI screen shown in FIG. 20, the output measurement result file and image data are stored in a folder named "trench".

Example of Image Data Displayed in Superimposed Manner

FIG. 22 is a diagram illustrating an example of the image data in which the estimated skeletons of the trained model are displayed on the input image in a superimposed manner. Further, FIG. 23 is a diagram illustrating an example of the image data in which the measured values are displayed on the same input image as that in FIG. 22 in a superimposed manner.

As described above, even when the measurement portion is added, by the dimension measuring system or the dimension measuring method according to the present embodiment, the machine learning model can be trained while reducing the man-hours for correction as compared with that of the related art.

In the present embodiment, the configuration example in which the HPE model is applied to the measurement of the semiconductor pattern using the cross-sectional SEM image has been described, but the technique according to the present disclosure can also be applied to a planar SEM image, a planar TEM image, a cross-sectional TEM image, a planar focused ion beam (FIB) image, or a cross-sectional FIB image. However, regarding the cross-sectional SEM image, the cross-sectional TEM image, or the cross-sectional FIB image, measurement difficulties which do not exist in the planar SEM image, the planar TEM image, and the planar FIB image, such as (1) a difference in brightness for each image, (2) imaging of a deep structure that is not necessary for the dimension measurement, and (3) an unclear boundary between interfaces of different materials whose dimensions are desired to be measured, so that it can be said that an effect achieved when the technique according to the present embodiment is applied is more significant than that for the cross-sectional SEM image, the cross-sectional TEM image, or the cross-sectional FIB image.

(B) Embodiment 2

In the present embodiment, a configuration example in a case where the present embodiment is applied to a charged particle beam device that includes an imaging device of a scanning electron microscope, a transmission electron microscope, a focused ion beam device, or the like, and an operation terminal 2002 connected to the imaging device will be described.

<Installation Environment of Charged Particle Beam Device>

FIG. 24 is a diagram illustrating an example of a system environment of a semiconductor device manufacturing system in which a charged particle beam device 2000 according to the present embodiment is installed. The charged particle beam device 2000 includes an imaging device 2001, the operation terminal 2002, and the manual image analysis tool 127. That is, the semiconductor device manufacturing system is a semiconductor device manufacturing system provided with a platform in which an application for extracting coordinate information on base points for measuring a dimension of a desired portion of image data, and measuring the dimension by using the coordinate information on the base points is installed, the application is configured to perform: a step of allowing training by integrating, in a case where a plurality of pieces training data having different number of measurement portions are included in a training data set, an image of the data in which the number of measurement portions is insufficient by setting an insufficient base point as an insufficient measurement portion and shielding a region assumed as the insufficient measurement portion; a step of automatically designing a skeleton including at least two of the base points of the image data as key points, inputting image data to be measured into a pose estimation model trained to output coordinate information on each of the key points, and generating coordinate information on each of the key points of the input image data; and a step of measuring the dimension by using the coordinate information on each of the key points of the image data to be measured, and the pose estimation model is trained by using training data in which the image data is set as an input and the coordinate information on at least two of the base points is set as an output.

The imaging device 2001 is an SEM, a TEM, an FIB device, an FIB-SEM, or the like. The operation terminal 2002 is a PC (an external computer when viewed from the server 101) that includes an input and output device such as a keyboard, a mouse, and a display, and incorporates a storage medium such as a hard disk, and the operation terminal 2002 is connected to the server 101 (the same as in Embodiment 1) via a public switched telephone network (the network) 2003 such as the Internet. Although not illustrated, the evaluation device 100, the processing device 111, and the like are disposed around the server 101 as in FIG. 1, and an environment in which the HPE model can be trained is prepared. Further, it is assumed that the HPE model stored in the server 101 has already been trained. The image analysis tool 127 is installed in the hard disk of the operation terminal 2002, and the GUI is displayed on the display. For example, an operator (a user) of the operation terminal 2002 reads image data (new data) whose dimension is to be measured, and transmits the image data (a new measurement target) to the server 101 via the network 2003.

As described above, the server 101 applies the image data to the trained model (the pose estimation model) to generate information on key point coordinates and skeleton data, and then performs the dimension measurement. Then, the server 101 transmits the dimension measurement result to the operation terminal 2002 via the network 2003. Further, a function and an operation method of the image analysis tool 127 are the same as the content described in the embodiment described above, the image analysis tool outputs coordinate information on a desired portion, and the computer system converts the output data of the image analysis tool including the coordinate information into annotation data of the training data during training of the pose estimation model. The computer system generates, during training of the pose estimation model, definition data of the skeleton structure of the pose estimation model by using rule information received in advance and the output data including the coordinate information. Further, the skeleton structure is a radiation type structure in which one base point is connected to all other base points.

Configuration Example of Image Analysis Tool

FIG. 25 is a diagram illustrating a configuration example of a dashboard displayed on the GUI of the image analysis tool 127 according to the present embodiment. A dashboard 400 illustrated in FIG. 25 includes a measurement state displaying panel 401, a measurement result list panel 402, a model change history displaying panel 403, a measurement progress state panel 404, a progress state panel 405, a standard deviation transition displaying panel 406, and the like. Information displayed on these panels is very effective when remotely monitoring a progress state of the training of the HPE model stored in the server 101, an abnormality in the dimension measurement using the trained HPE model, and the like.

On the GUI illustrated in FIG. 20 displayed on the display of the operation terminal 2002, for example, an icon for calling the dashboard in FIG. 25 is displayed. When the icon is clicked, a hyper text transfer protocol (http) request for calling the dashboard is transmitted from the operation terminal 2002, and content data constituting the dashboard is encrypted and then transmitted from the server 101. The content data itself may not be transmitted, and a uniform resource locator (url) of a content browsing site may be transmitted from the server 101.

Although the configuration in which the dashboard is displayed on the operation terminal 2002 has been described above, if an image acquired by the imaging device 2001 is transmitted from the operation terminal 2002 to the server 101, it is also possible to perform the dimension measurement on the image acquired by the imaging device 2001. A result of the dimension measurement performed by the server 101 is encrypted and then returned to the operation terminal 2002. When a storage medium (a hard disk, a RAID array, or the like) in which the trained HPE model is stored is connected to the operation terminal 2002, it is also possible to perform the dimension measurement on the image acquired by the imaging device 2001. Accordingly, the charged particle beam device having a dimension measurement function according to the present embodiment is implemented.

The server 101 may be directly connected to the operation terminal 2002 without being remotely connected via the network, or a server different from the server 101 that is remotely connected may be directly connected to the operation terminal 2002, and the server may be installed as a mirror server of the server 101. In these connection forms, it is possible to achieve not only dimension measurement for the new image, but also implement the charged particle beam device capable of performing the training of the HPE model by using the image acquired by the imaging device 2001, in which the amount of data to be handled is large and a load applied to information processing and data transmission is large.

As described above, the embodiments of the invention have been specifically described, but the scope of rights according to the disclosure is not limited to the embodiments described above, and includes various modifications and equivalent configurations within the scope of the appended claims. For example, the embodiments described above have been described in detail for easy understanding of the technique of the disclosure, and the technique of the disclosure is not necessarily limited to the embodiments including all the configurations described above. A part of a configuration of one embodiment may be added to, deleted from, or replaced by another configuration.

Further, the configurations, functions, processing units, processing means, and the like described above may be achieved by hardware, and may be achieved by software. A case of achieving the configurations, functions, processing units, processing means, and the like by hardware is, for example, a case where a part or all of the configurations, functions, processing units, processing means, and the like described above may be designed by integrated circuits, and a case of achieving the configurations, functions, processing units, processing means, and the like by software is, for example, a case where a processor interprets and executes programs for achieving the functions. Information such as a program for achieving each function, a table, and a file can be stored in a storage device (a storage medium) such as a memory, a hard disk, and a solid state drive (SSD), or a recording medium (a storage medium) such as an integrated circuit (IC) card, an SD card, and a digital versatile disc (DVD).

Control lines and information lines indicate what is considered necessary for description, and not all the control lines and the information lines are necessarily shown in implementation. It may be considered that almost all the configurations are actually connected to each other.

Further, the computer system, the dimension measuring method, and the semiconductor device manufacturing system have been mainly described in the above description, and the disclosure also discloses the following storage medium.

A storage medium in a computer storing a program for achieving a dimension measurement function of extracting, from image data of a semiconductor pattern, coordinate information on a base point for measuring a dimension of a desired portion of the semiconductor pattern, and measuring the dimension by using the coordinate information, the storage medium includes:

- a preprocessing unit configured to allow training by integrating, in a case where a plurality of pieces of training data having different number of measurement portions are included in a training data set, an image of the data in which the number of measurement portions is insufficient by setting an insufficient base point to be invisible while shielding a region assumed as the insufficient measurement portion,
- the program includes
- a program code for implementing a learner that describes a pose estimation model for outputting coordinate information on at least two of the base points as a training result,
- the learner includes an input layer for receiving the image data of the semiconductor pattern and an output layer for outputting the coordinate information on at least two of the base points, and
- the pose estimation model can be trained by using training data in which the image data of the semiconductor pattern is set to an input and the coordinate information on at least two of the base points is set to an output.

In the storage medium,

- the program includes a program code for converting output data of an image analysis tool, which includes the coordinate information, into annotation data of the training data, and
- the image analysis tool has a function of calculating, by pixel calculation, a distance between predetermined portions of the image data designated on a GUI.

In the storage medium,

- the program includes a program code for generating definition data of a skeleton structure in the pose estimation model by using rule information received in advance and the output data of the image analysis tool which includes the coordinate information, and
- the image analysis tool has a function of calculating, by pixel calculation, the distance between predetermined portions of the image data designated on the GUI.

Although the preferred embodiments of the invention have been described above, the invention is not limited to the above embodiments, and elements may be modified without departing from the gist of the invention.

REFERENCE SIGNS LIST

10 network model for human pose estimation
15 add-in window
20 loading button
21 image deleting button
22 magnification cell

23 characteristic newly generating button
24 characteristic loading button
25 characteristic save button
26 measurement portion name cell
27 unit cell
28 color cell
29 measurement portion creating button
30 measurement portion deleting button
31 measured value list
32 measurement result save button
33 measurement result loading button
40 mask portion
41 substrate portion (silicon substrate portion)
42 key point
43 measurement portion (mask height)
44 measurement portion (trench depth)
45 measurement portion (line top)
46 measurement portion (CD necking)
47 measurement portion (line bottom)
50 skeleton
51 key point
52 key point
53 skeleton
54 skeleton
100 evaluation device
101 server
102 database
103 input and output device (terminal or PC)
110 dimension measuring system
111 processing device
115 interface
116 processor
117 ROM
118 RAM
124 HPE model unit
125 dimension measuring unit
126 storage
127 image analysis tool
128 dimension measurement software
129 input data
130 automatic measurement result
131 transmission data
132 input data
133 input data
200 training tab
201 measuring tab
202 conversion module executing button
203 automatic skeleton design module executing button
204 training start button
205 status cell
206 terminal window
210 training data storage folder designating button
211 trained model storage folder designating button
212 clear button
213 training data storage folder name cell
214 trained model storage folder name cell
341 manual button (individual measurement button)
342 batch button (collective measurement button)
343 measurement start button
344 clear button
345 input panel
346 folder name cell
347 file name cell
349 measurement portion definition list
350 input image panel
351 measurement result loading button
352 measurement result display clear button
353 output panel
354 folder name cell
355 file name cell
356 pose detection screen (pose estimation result displaying panel)
357 dimension measurement result displaying panel
358 dimension measurement result cell
400 dashboard
401 measurement state displaying panel
402 measurement result list panel
403 model change history displaying panel
404 measurement progress state panel
405 progress state panel
406 standard deviation transition displaying panel
2000 charged particle beam device
2001 imaging device
2000 operation terminal
2003 public switched telephone network (network)

The invention claimed is:

1. A computer system for providing a function of extracting, from image data including a pattern, coordinate information on base points for measuring a dimension of a desired portion of the pattern, and measuring the dimension by using the coordinate information on the base points, the computer system comprising:

a preprocessing unit configured to allow training, in a case where a sample in which coordinates of all of the base points are described and a sample in which coordinates of only a part of the base points are described are mixed in a training data set, by matching all of the samples by locally shielding a region estimated as an insufficient base point on the image data which is insufficient in annotation data, for the sample in which coordinate values of only a part of the base points are described, wherein the preprocessing unit includes a learner in which a pose estimation model for outputting coordinate information on at least two of the base points as a training result is installed, the learner is trained in advance by using training data in which the image data is set as an input and the coordinate information on at least two of the base points is set as an output, and the coordinate information on at least two of the base points and the dimension are extracted for new image data input to the learner.

2. The computer system according to claim 1, wherein a coordinate value of the locally shielded region is obtained by creating a regression formula model which is estimated based on coordinate values of other known base points.

3. The computer system according to claim 1, further comprising:

a storage medium in which an image analysis tool is installed, the image analysis tool having a function of calculating, by pixel calculation, a distance between predetermined portions of the image data designated on a GUI and a function of outputting coordinate information on the desired portion.

4. The computer system according to claim 3, further comprising:

a first software module configured to convert output data of the image analysis tool which includes the coordinate information into annotation data constituting the training data.

5. The computer system according to claim 3, further comprising:

a second software module configured to generate definition data of a skeleton structure in the pose estimation model by using output data of the image analysis tool, which includes the coordinate information, and rule information received in advance.

6. The computer system according to claim 1, further comprising:

a display unit configured to function as a user interface for displaying the image data, wherein the display unit displays, on the user interface, data in which the image data and the extracted at least two base points are superimposed.

7. The computer system according to claim 6, wherein the display unit further displays, on the user interface, a skeleton structure of the image data in a superimposed manner, the skeleton structure being constituted by a plurality of combinations of line segments each connecting at least two of the base points.

8. The computer system according to claim 1, wherein the image data is a cross-sectional image obtained by a charged particle beam device.

9. A dimension measuring method of a computer system extracting coordinate information on base points for measuring a dimension of a desired portion of image data, measuring the dimension by using the coordinate information on the base points, wherein a preprocessing unit is provided which is configured to allow training by integrating, in a case where a plurality of pieces of training data having different number of measurement portions are included in a training data set, an image of the data in which the number of measurement portions is insufficient by setting an insufficient base point as an insufficient measurement portion and shielding a region assumed as the insufficient measurement portion, the preprocessing unit automatically designs a skeleton that includes at least two of the base points of the image data as key points, inputs image data to be measured into a pose estimation model trained to output coordinate information on each of the key points, and generates coordinate information on each of the key points of the input image data, the dimension is measured by using the coordinate information on the key points of the image data to be measured, and the pose estimation model is trained by using training data in which the image data is set as an input and the coordinate information on at least two of the base points is set as an output.

10. The dimension measuring method according to claim 9, wherein the computer system refers to the coordinate information on at least two of the base points and measures the dimension, by using an image analysis tool configured to calculate, by pixel calculation, a distance between predetermined portions of the image data designated on a GUI.

11. The dimension measuring method according to claim 10, wherein the image analysis tool outputs coordinate information on the desired portion, and the computer system converts the output data of the image analysis tool, which includes the coordinate information, into annotation data of the training data during training of the pose estimation model.

12. The dimension measuring method according to claim 9, wherein the computer system generates, by using rule information received in advance and the output data including the coordinate information, definition data of a skeleton structure in the pose estimation model during training of the pose estimation model.

13. The dimension measuring method according to claim 12, wherein the skeleton structure is a radiation type structure in which one of the base points is connected to all of other base points.

14. The dimension measuring method according to claim 9, wherein the computer system receives new image data to be measured from an external computer via a network, and the computer system measures the dimension of a pattern included in the new image data to be measured, and transmits a measurement result of the dimension to the external computer.

15. A semiconductor device manufacturing system provided with a platform in which an application for extracting coordinate information on base points for measuring a dimension of a desired portion of image data, and measuring the dimension by using the coordinate information on the base points is installed, wherein the application is configured to perform:

a step of allowing training by integrating, in a case where a plurality of pieces of training data having different number of measurement portions are included in a training data set, an image of the data in which the number of measurement portions is insufficient by setting an insufficient base point as an insufficient measurement portion and shielding a region assumed as the insufficient measurement portion;

a step of automatically designing a skeleton that includes at least two of the base points of the image data as key points, inputting image data to be measured into a pose estimation model trained to output coordinate information on each of the key points, and generating coordinate information on each of the key points of the input image data; and step of measuring the dimension by using the coordinate information on each of the key points of the image data to be measured, and the pose estimation model is trained by using training data in which the image data is set as an input and the coordinate information on at least two of the base points is set as an output.

* * * * *